US010389116B2

(12) United States Patent
Tani

(10) Patent No.: US 10,389,116 B2
(45) Date of Patent: Aug. 20, 2019

(54) DISTRIBUTED ELECTRIC POWER GENERATION SYSTEM, CONTROL STATION, AND METHOD OF CONTROLLING THE SAME

(71) Applicant: NEC Corporation, Tokyo (JP)

(72) Inventor: Yumi Tani, Tokyo (JP)

(73) Assignee: NEC Corporation, Tokyo (JP)

( * ) Notice: Subject to any disclaimer, the term of this patent is extended or adjusted under 35 U.S.C. 154(b) by 1092 days.

(21) Appl. No.: 14/650,656

(22) PCT Filed: Dec. 10, 2013

(86) PCT No.: PCT/JP2013/083540
§ 371 (c)(1),
(2) Date: Jun. 9, 2015

(87) PCT Pub. No.: WO2014/092195
PCT Pub. Date: Jun. 19, 2014

(65) Prior Publication Data
US 2015/0318698 A1 Nov. 5, 2015

(30) Foreign Application Priority Data

Dec. 10, 2012 (JP) ................................. 2012-269151

(51) Int. Cl.
*H02J 3/00* (2006.01)
*G05B 15/02* (2006.01)
(Continued)

(52) U.S. Cl.
CPC ................ *H02J 3/00* (2013.01); *G05B 15/02* (2013.01); *H02J 3/24* (2013.01); *H02J 3/381* (2013.01);
(Continued)

(58) Field of Classification Search
None
See application file for complete search history.

(56) References Cited

U.S. PATENT DOCUMENTS 7,444,189 B1 * 10/2008 Marhoefer .......... H01M 8/0612
700/26
2005/0071299 A1  3/2005 Kiyono et al.
(Continued)

FOREIGN PATENT DOCUMENTS

JP    2003-111275 A    4/2003
JP    2005-100213 A    4/2005
(Continued)

OTHER PUBLICATIONS

Notification of Reasons for Refusal dated Jan. 31, 2018, Issued by the Japanese Patent Office in counterpart Japanese Patent Application No. 2014-552106.
(Continued)

*Primary Examiner* — Mohammad Ali
*Assistant Examiner* — Saad M Kabir
(74) *Attorney, Agent, or Firm* — Finnegan, Henderson, Farabow, Garrett & Dunner, L.L.P.

(57) ABSTRACT

The present disclosure relates to a distributed electric power generation system including a plurality of electric power distribution stations; a power transmission grid network connected to the plurality of electric power distribution stations and a plurality of demand loads; and a control station including a processor configured to execute computer instructions to: calculate a period during which electric power supply is needed, acquire an amount of power supply demand to be supplied via the power transmission grid network during the calculated period and select a least costly combination of the electric power distribution stations for the plurality of demand loads based upon a start and stop cost and a running cost of each of the electric power distribution stations in accordance with the calculated period and the amount of power supply demand.

22 Claims, 22 Drawing Sheets

(51) Int. Cl.
  *H02J 3/46*    (2006.01)
  *H02J 3/24*    (2006.01)
  *H02J 3/38*    (2006.01)
  *H02J 13/00*   (2006.01)
  *H02J 9/08*    (2006.01)

(52) U.S. Cl.
  CPC ............ *H02J 3/46* (2013.01); *H02J 13/0006* (2013.01); *H02J 9/08* (2013.01); *H02J 2003/388* (2013.01); *Y02B 90/222* (2013.01); *Y02E 40/72* (2013.01); *Y04S 10/12* (2013.01); *Y04S 20/12* (2013.01)

(56) References Cited

U.S. PATENT DOCUMENTS

| | | | |
|---|---|---|---|
| 2007/0005192 A1* | 1/2007 | Schoettle | H02J 3/32 700/286 |
| 2013/0103378 A1 | 4/2013 | Tinnakornsrisuphap et al. | |
| 2013/0144455 A1 | 6/2013 | Oe | |

FOREIGN PATENT DOCUMENTS

| | | |
|---|---|---|
| JP | 2005-143238 | 6/2005 |
| JP | 2008-11612 | 1/2008 |
| JP | 2008-154430 | 7/2008 |
| JP | 2009-189226 | 8/2009 |
| JP | 2011-114900 | 6/2011 |
| WO | WO 2011/155251 A1 | 12/2011 |
| WO | WO 2012/144473 A1 | 10/2012 |

OTHER PUBLICATIONS

International Search Report and Written Opinion dated Feb. 25, 2014 in corresponding PCT International Application.

Decision to Grant a Patent dated Aug. 29, 2018, issued by the Japanese Patent Office in Japanese Patent Application No. 2014-552106.

* cited by examiner

| DEMAND LOAD | DEMAND (kW) |
|---|---|
| 1 | 90 |
| 2 | 70 |
| 3,4 (TOTAL) | 150 |

FIG. 8A

| COMBI-NATION | ELECTRIC POWER GENERATION FACILITY 1 100kW | SW12 | ELECTRIC POWER GENERATION FACILITY 2 200kW | SW23 | ELECTRIC POWER GENERATION FACILITY 3 300kW | CAN COVER DEMAND? | FUEL COST (YEN) |
|---|---|---|---|---|---|---|---|
| 1 | 90kW | Open | 220kW | Close | On | No | - |
| | On | | Off | | 220kW | Yes | 3500 |
| 2 | 160kW | Close | On | Open | 150 | YES | 5000 |
| | Off | | 160kW | | On | No | - |

FIG. 8B

Uc table

| HOUR | G1 | SW12 | G2 | SW23 | G3 |
|---|---|---|---|---|---|
| 1 | 1 | 1 | 0 | 1 | 0 |
| 2 | 1 | 0 | 1 | 1 | 0 |
| 3 | 1 | 0 | 1 | 1 | 0 |
| 4 | 1 | 0 | 1 | 1 | 0 |
| 5 | 1 | 0 | 1 | 1 | 0 |
| 6 | 1 | 0 | 1 | 1 | 0 |
| 7 | 1 | 0 | 0 | 1 | 1 |
| 8 | 1 | 0 | 0 | 1 | 1 |
| 9 | 1 | 0 | 0 | 1 | 1 |
| 10 | 1 | 0 | 1 | 0 | 1 |
| 11 | 1 | 0 | 1 | 0 | 1 |
| 12 | 1 | 0 | 1 | 0 | 1 |
| 13 | 1 | 0 | 1 | 0 | 1 |
| 14 | 1 | 0 | 1 | 0 | 1 |
| 15 | 1 | 0 | 1 | 0 | 1 |
| 16 | 1 | 0 | 1 | 0 | 1 |
| 17 | 1 | 1 | 0 | 0 | 1 |
| 18 | 1 | 1 | 0 | 0 | 1 |
| 19 | 1 | 1 | 0 | 0 | 1 |
| 20 | 1 | 1 | 0 | 0 | 1 |
| 21 | 1 | 1 | 0 | 0 | 1 |
| 22 | 1 | 1 | 0 | 0 | 1 |
| 23 | 0 | 1 | 1 | 0 | 1 |
| 24 | 0 | 1 | 1 | 0 | 1 |

G: ELECTRIC POWER GENERATION FACILITY
1···ON(START)
0···OFF(STOP)

SW: ELECTRIC POWER NETWORK SWITCH
1···ON(Close)
0···OFF(Open)

FIG. 10

DEMAND PREDICTION

| HOUR | L1 | L2 | L3 |
|---|---|---|---|
| 1 | 30 | 50 | 50 |
| 2 | 80 | 50 | 150 |
| 3 | 80 | 50 | 150 |
| 4 | 80 | 50 | 150 |
| 5 | 80 | 50 | 150 |
| 6 | 80 | 50 | 150 |
| 7 | 90 | 70 | 150 |
| 8 | 90 | 70 | 150 |
| 9 | 90 | 70 | 150 |
| 10 | 100 | 180 | 200 |
| 11 | 100 | 190 | 230 |
| 12 | 100 | 200 | 260 |
| 13 | 100 | 200 | 290 |
| 14 | 100 | 200 | 280 |
| 15 | 100 | 190 | 270 |
| 16 | 90 | 160 | 260 |
| 17 | 80 | 140 | 200 |
| 18 | 80 | 120 | 150 |
| 19 | 70 | 100 | 150 |
| 20 | 70 | 90 | 110 |
| 21 | 60 | 90 | 90 |
| 22 | 60 | 80 | 60 |
| 23 | 50 | 60 | 50 |
| 24 | 40 | 50 | 40 |

L: DEMAND LOAD
UNIT: [kW]

FIG. 11

| COMBI-NATION | G1 | SW12 | G2 | SW23 | G3 | DETERMINATION RESULTS OF REASONABILITY |
|---|---|---|---|---|---|---|
| 1 | 1 | 1 | 0 | 1 | 0 | ○ |
| 2 | 1 | 1 | 1 | 1 | 1 | × TWO OR MORE ELECTRIC POWER GENERATION FACILITIES ARE OPERATED. |
| 3 | 1 | 0 | 1 | 0 | 1 | ○ |
| 4 | 0 | 0 | 0 | 1 | 0 | × NO ELECTRIC POWER GENERATION FACILITY IS OPERATED. |
| 5 | 1 | 1 | 0 | 0 | 1 | ○ |
| 6 | 0 | 1 | 1 | 0 | 1 | ○ |
| 7 | 1 | 0 | 1 | 1 | 0 | ○ |
| 8 | 1 | 0 | 0 | 1 | 1 | ○ |
| 9 | 0 | 0 | 0 | 0 | 0 | × NO ELECTRIC POWER GENERATION FACILITY IS OPERATED. |
| ⋮ | ⋮ | ⋮ | ⋮ | ⋮ | ⋮ | ⋮ |
| 32 | . | . | . | . | . | . |

FIG. 12

| COMBI-NATION | G1 100kW | SW1 | G2 200kW | SW2 | G3 300kW | FUEL COST/ COMMENTS |
|---|---|---|---|---|---|---|
| 1 | 310 | ON | 0 | ON | 0 | EXCEEDS CAPACITY OF G1 |
| 3 | 90 | OFF | 70 | OFF | 150 | 1500 YEN |
| 5 | 160 | ON | 0 | OFF | 150 | EXCEEDS CAPACITY OF G1 |
| 6 | 0 | ON | 160 | OFF | 150 | 1300 YEN |
| 7 | 90 | OFF | 220 | ON | 0 | EXCEEDS CAPACITY OF G2 |
| ⑧ | 90 | OFF | 0 | ON | 220 | 1200 YEN |

FIG. 13

| HOUR | SW1 | G1 | SW2 | G2 | SW3 | G3 |
|---|---|---|---|---|---|---|
| 1 | 1 | 1 | 1 | 0 | 1 | 0 |
| 2 | 1 | 1 | 0 | 1 | 1 | 0 |
| 3 | 1 | 1 | 0 | 1 | 1 | 0 |
| 4 | 1 | 1 | 0 | 1 | 1 | 0 |
| 5 | 1 | 1 | 0 | 1 | 1 | 0 |
| 6 | 1 | 1 | 0 | 1 | 1 | 0 |
| 7 | 1 | 1 | 0 | 1 | 0 | 1 |
| 8 | 1 | 1 | 0 | 1 | 0 | 1 |
| 9 | 0 | 1 | 0 | 1 | 0 | 1 |
| 10 | 0 | 1 | 0 | 1 | 0 | 1 |
| 11 | 1 | 1 | 0 | 1 | 0 | 1 |
| 12 | 1 | 1 | 0 | 1 | 0 | 1 |
| 13 | 1 | 1 | 0 | 1 | 0 | 1 |
| 14 | 1 | 1 | 0 | 1 | 0 | 1 |
| 15 | 1 | 1 | 0 | 1 | 0 | 1 |
| 16 | 1 | 1 | 0 | 1 | 0 | 1 |
| 17 | 1 | 1 | 1 | 0 | 0 | 1 |
| 18 | 1 | 1 | 1 | 0 | 0 | 1 |
| 19 | 0 | 1 | 1 | 0 | 0 | 1 |
| 20 | 0 | 1 | 1 | 0 | 0 | 1 |
| 21 | 0 | 1 | 1 | 0 | 0 | 1 |
| 22 | 0 | 1 | 1 | 0 | 0 | 1 |
| 23 | 0 | 0 | 1 | 1 | 0 | 1 |
| 24 | 0 | 0 | 1 | 1 | 0 | 1 |

FIG. 16

| COMBI-NATION | SW1 | G1 | SW2 | G2 | SW3 | G3 | DETERMINATION RESULTS OF REASONABILITY |
|---|---|---|---|---|---|---|---|
| 1 | 1 | 1 | 1 | 0 | 1 | 0 | ○ |
| 2 | 1 | 1 | 1 | 1 | 1 | 1 | × TWO OR MORE ELECTRIC POWER GENERATION FACILITIES ARE OPERATED. |
| 3 | 0 | 1 | 0 | 1 | 0 | 1 | ○ |
| 4 | 1 | 0 | 0 | 1 | 1 | 0 | × NO ELECTRIC POWER GENERATION FACILITY IS OPERATED TO SUPPLY ELECTRIC POWER TO LOADS 1, 3, AND 4. |
| 5 | 1 | 1 | 1 | 0 | 0 | 1 | ○ |
| 6 | 1 | 0 | 1 | 1 | 0 | 1 | ○ |
| 7 | 0 | 1 | 1 | 1 | 1 | 0 | ○ |
| 8 | 0 | 1 | 0 | 0 | 1 | 1 | ○ |
| 9 | 0 | 0 | 0 | 0 | 0 | 0 | × NO ELECTRIC POWER GENERATION FACILITY IS OPERATED. |
| 10 | 1 | 0 | 0 | 1 | 1 | 1 | ○ |
| ⋮ | ⋮ | ⋮ | ⋮ | ⋮ | ⋮ | ⋮ | ⋮ |

FIG. 17

| COMBI-NATION | SW1 | G1 100kW | SW2 | G2 200kW | SW3 | G3 300kW | FUEL COST/ COMMENTS |
|---|---|---|---|---|---|---|---|
| 1 | ON | 310 | ON | 0 | ON | 0 | EXCEEDS CAPACITY OF G1 |
| 3 | OFF | 90 | OFF | 70 | OFF | 150 | 1500 YEN |
| 5 | ON | 160 | ON | 0 | OFF | 150 | EXCEEDS CAPACITY OF G1 |
| 6 | ON | 0 | ON | 160 | OFF | 150 | EXCEEDS CAPACITY OF G2 |
| 7 | OFF | 90 | ON | 210 | ON | 0 | EXCEEDS CAPACITY OF G2 |
| 8 | OFF | 90 | OFF | 0 | ON | 210 | 1400 YEN |
| ⑩ | ON | 0 | OFF | 70 | ON | 260 | 1200 YEN |

FIG. 18

| HOUR | SW1 | G1 | SW2 | G21 | SW21 | G22 | SW3 | SW31 | G31 | SW32 | G32 |
|---|---|---|---|---|---|---|---|---|---|---|---|
| 1 | 0 | 1 | 0 | 1 | 1 | 0 | 1 | 1 | 0 | 0 | 1 |
| 2 | 1 | 0 | 0 | 1 | 1 | 0 | 1 | 1 | 0 | 1 | 1 |
| 3 | 1 | 0 | 0 | 1 | 1 | 0 | 1 | 1 | 0 | 1 | 1 |
| 4 | 1 | 0 | 0 | 1 | 1 | 0 | 1 | 1 | 0 | 1 | 1 |
| 5 | 1 | 0 | 0 | 1 | 1 | 0 | 1 | 1 | 0 | 1 | 1 |
| 6 | 1 | 0 | 0 | 1 | 1 | 0 | 1 | 1 | 0 | 1 | 1 |
| 7 | 0 | 1 | 0 | 1 | 0 | 1 | 0 | 0 | 1 | 0 | 1 |
| 8 | 0 | 1 | 0 | 1 | 0 | 1 | 0 | 0 | 1 | 0 | 1 |
| 9 | 0 | 1 | 0 | 1 | 0 | 1 | 0 | 0 | 1 | 0 | 1 |
| 10 | 0 | 1 | 0 | 1 | 0 | 1 | 0 | 0 | 1 | 0 | 1 |
| 11 | 0 | 1 | 0 | 1 | 0 | 1 | 0 | 0 | 1 | 0 | 1 |
| 12 | 0 | 1 | 0 | 1 | 0 | 1 | 0 | 0 | 1 | 0 | 1 |
| 13 | 0 | 1 | 0 | 1 | 0 | 1 | 0 | 0 | 1 | 0 | 1 |
| 14 | 0 | 1 | 0 | 1 | 0 | 1 | 0 | 0 | 1 | 0 | 1 |
| 15 | 0 | 1 | 0 | 1 | 0 | 1 | 0 | 0 | 1 | 0 | 1 |
| 16 | 0 | 1 | 0 | 1 | 0 | 1 | 0 | 0 | 1 | 0 | 1 |
| 17 | 1 | 0 | 1 | 0 | 0 | 1 | 0 | 1 | 0 | 1 | 1 |
| 18 | 1 | 0 | 1 | 0 | 0 | 1 | 0 | 1 | 0 | 1 | 1 |
| 19 | 1 | 0 | 1 | 0 | 0 | 0 | 1 | 0 | 1 | 1 | 1 |
| 20 | 1 | 0 | 1 | 0 | 0 | 0 | 1 | 0 | 1 | 1 | 1 |
| 21 | 1 | 0 | 1 | 0 | 0 | 0 | 1 | 0 | 1 | 1 | 1 |
| 22 | 1 | 0 | 1 | 0 | 0 | 0 | 1 | 0 | 1 | 1 | 1 |
| 23 | 0 | 1 | 0 | 1 | 1 | 0 | 1 | 1 | 0 | 0 | 1 |
| 24 | 0 | 1 | 0 | 1 | 1 | 0 | 1 | 1 | 0 | 0 | 1 |

FIG. 20

| COMBI-NATION | SW1 | G1 | SW2 | G21 | SW21 | G22 | SW3 | SW31 | G31 | SW32 | G32 | DETERMINATION RESULTS OF REASONABILITY |
|---|---|---|---|---|---|---|---|---|---|---|---|---|
| 1 | 1 | 1 | 1 | 0 | 1 | 0 | 1 | 1 | 0 | 1 | 0 | ○ |
| 2 | 1 | 1 | 1 | 1 | 1 | 0 | 1 | 1 | 1 | 0 | 0 | × TWO OR MORE ELECTRIC POWER GENERATION FACILITIES ARE OPERATED. |
| 3 | 0 | 1 | 0 | 1 | 0 | 1 | 0 | 0 | 1 | 0 | 1 | ○ COMBINATION FOR USUAL OPERATION |
| 4 | 1 | 0 | 0 | 0 | 1 | 0 | 1 | 1 | 0 | 1 | 0 | × NO ELECTRIC POWER GENERATION FACILITY IS OPERATED. |
| 5 | 1 | 1 | 1 | 0 | 1 | 0 | 0 | 1 | 1 | 1 | 0 | ○ |
| 6 | 1 | 0 | 1 | 1 | 1 | 0 | 1 | 1 | 1 | 0 | 1 | × TWO OR MORE ELECTRIC POWER GENERATION FACILITIES ARE OPERATED. |
| 7 | 0 | 1 | 0 | 1 | 1 | 0 | 1 | 1 | 0 | 0 | 1 | ○ |
| 8 | 1 | 0 | 1 | 0 | 0 | 0 | 1 | 0 | 1 | 1 | 1 | ○ |
| 9 | 0 | 0 | 0 | 0 | 0 | 0 | 0 | 0 | 0 | 0 | 0 | × NO ELECTRIC POWER GENERATION FACILITY IS OPERATED. |
| 10 | 1 | 0 | 1 | 0 | 0 | 1 | 0 | 1 | 0 | 1 | 1 | ○ |
| ⋮ | ⋮ | ⋮ | ⋮ | ⋮ | ⋮ | ⋮ | ⋮ | ⋮ | ⋮ | ⋮ | ⋮ | ⋮ |

FIG. 21

| COMBI-NATION | SW1 | G1 100W | SW2 | G21 100W | SW21 | G22 200W | SW3 | SW31 | G31 200W | SW32 | G32 300W | FUEL COST/COMMENTS |
|---|---|---|---|---|---|---|---|---|---|---|---|---|
| 1 | ON | 380 | ON | 0 | ON | 0 | ON | ON | 0 | ON | 0 | EXCEEDS CAPACITY OF G1 |
| 3 | Off | 80 | Off | 50 | Off | 50 | ON | ON | 150 | ON | 100 | 1500 YEN |
| 5 | ON | 130 | ON | 0 | ON | 0 | Off | ON | 250 | ON | 0 | EXCEEDS CAPACITY OF G31 |
| 7 | Off | 80 | Off | 100 | ON | 0 | ON | ON | 0 | ON | 250 | 1450 YEN |
| ⑧ | ON | 0 | ON | 0 | ON | 0 | ON | Off | 150 | ON | 280 | 1300 YEN |
| 10 | ON | 0 | Off | 0 | ON | 180 | Off | ON | 230 | ON | 250 | 1400 YEN |
| ⋮ | ⋮ | ⋮ | ⋮ | ⋮ | ⋮ | ⋮ | ⋮ | ⋮ | ⋮ | ⋮ | ⋮ | ⋮ |

FIG. 22

DISTRIBUTED ELECTRIC POWER GENERATION SYSTEM, CONTROL STATION, AND METHOD OF CONTROLLING THE SAME

CROSS-REFERENCE TO RELATED PATENT APPLICATIONS

This application is a National Stage Entry of International Application No. PCT/JP2013/083540, filed Dec. 10, 2013, which claims priority from Japanese Patent Application No. 2012-269151, filed Dec. 10, 2012. The entire contents of the above-referenced applications are expressly incorporated herein by reference.

TECHNICAL FIELD

The present invention relates to a distributed electric power generation system connected with a power transmission grid network, and more particularly to a distributed electric power generation system and a control station that perform operation control of each of electric power generation means so as to optimize a running cost, and a method of controlling the same.

BACKGROUND OF THE INVENTION

Some distributed electric power supply systems have been proposed in which a plurality of electric power generation facilities are connected to demand loads via a power transmission grid network such that operation control of each of the electric power generation facilities can be performed.

Proposed examples of distributed power supply systems include Patent Literatures 1 to 3.

A distributed electric power supply system disclosed in Patent Literature 1 has a plurality of electric power generating apparatuses that supply electric power to power loads and an electric power generation number controller operable to control the number of the electric power generating apparatuses which are operating. The plurality of electric power generating apparatuses and the electric power generation number controller are connected via a communication network. When a plurality of electric power generating apparatuses give a whole amount of power loads in the system in a distributed manner, the electric power generation number controller determines the number of operating or active electric power generating apparatuses all of which generate the amount of electric power equal to or greater than thresholds by removing a small amount and insufficient electric power generation.

A distributed electric power supply system disclosed in Patent Literature 2 determines active or operating electric power generators so that minimize power transmission loss (suppress power flow) in order to consider inefficiency resulting from power transmission loss in a power transmission network.

A distributed electric power supply system disclosed in Patent Literature 3 performs control for separating certain power loads (power loads of less priority) when a commercial power supply is interrupted and a distributed electric power supply cannot cover the total amount of electric power required. Furthermore, this system receives an input of a power cut period from an administrator and predicts and calculates an electric power demand for that period (power cut period) with an electric power demand prediction tool, thereby verifying the sufficiency of the demand.

Additionally, while smart grids for a commercial power supply are being developed, other systems are also being developed to construct and operate relatively small power transmission grids within a predetermined area independently of the infrastructural network (commercial power supply network). The grids operated in the predetermined area are referred to as microgrids, picogrids, or cells. The predetermined area is set in an appropriate manner at each necessary time. For example, the predetermined area is formed by a regional area, a city, a building, several houses, or the like. Furthermore, a grid network for a plurality of buildings such as a school or a hospital is also being developed.

PRIOR ART LITERATURE

Patent Literature

Patent Literature 1: JP-A 2009-189226
Patent Literature 2: JP-A 2005-143238
Patent Literature 3: JP-A 2008-011612

SUMMARY OF THE INVENTION

Problem(s) to be Solved by Invention

Many proposals have considered balanced control between electric power generated in a distributed electric power generation system and a large number of demand loads.

However, the inventor has found one problem in an aspect of a running cost upon operating a distributed electric power generation system connected with a power transmission grid network so as to cover a predetermined area.

Here, specific problems will be described with use of the exemplary prior art references.

The distributed electric power generation control system of Patent Literature 1 maintains the power generation efficiency at a certain level or higher and operates as many electric power generators as possible to follow changes of the demands. On the other hand, this system suffers from significant loss when a fuel loss generated upon turning the electric power generating apparatuses on and off is taken into account.

The distributed electric power generation system of Patent Literature 2 selects high-efficiency electric power generators as active electric power generators in consideration of power transmission losses and the like. Nevertheless, this system similarly suffers from a wasted fuel cost caused by a small amount of electric power generation.

This also holds true for the distributed electric power generation system of Patent Literature 3.

Furthermore, desirable embodiments of a distributed electric power generation system for reducing a running cost with maintained quality of electric power or the like have been examined in consideration of a wide variety of electric power conditions in the world.

Moreover, systems that are generally excellent or are excellent under certain conditions have been examined along with the aforementioned aspects in order to efficiently use existing electric power networks (commercial power systems), electric power facilities, and consumer's facilities.

The present invention provides a distributed electric power generation system that can reduce a running cost through selective control of active power generators that achieve an increased efficiency of distributed electric power generation that covers a predetermined grid, as compared to existing systems, and a method of controlling such a distributed electric power generation system.

Means for Solving the Problems(s)

A distributed electric power generation system according to the present invention is characterized by comprising: a plurality of electric power distribution stations operable to receive electric power from an external power source and generate electric power in a balanced manner; a power transmission grid network connected to the plurality of electric power distribution stations for supplying received electric power to a plurality of demand loads using electric power; and a control station operable to acquire information on an electric power distribution period used to calculate a period during which electric power supply is needed, acquire an amount of power supply demand to be supplied via the power transmission grid network during the period during which electric power supply is needed, the period being determined from the acquired information on the electric power distribution period, and select a less costly combination of one or a required number of electric power generation facilities for supplying electric power to the plurality of demand loads based upon a start and stop cost and a running cost of each of the electric power distribution stations in accordance with the calculated electric power distribution period and the amount of power supply demand.

A control station for distributed electric power generation according to the present invention is characterized by comprising: a power cut status detection part operable to acquire information on an electric power distribution period used to calculate a period during which electric power supply is needed upon an interruption of electric power supply from an external power source in order to supply electric power to a plurality of demand loads connected to a power transmission grid network with a plurality of electric power distribution stations that can generate electric power upon the interruption of the external power source; an electric power demand monitor part operable to acquire an amount of power supply demand to be supplied via the power transmission grid network during the period during which electric power supply is needed, the period being determined from the information on the electric power distribution period; and an operating electric power generation facility determination part operable to select a less costly combination of one or a required number of electric power distribution stations for supplying electric power to the plurality of demand loads as electric power generation facilities based upon a start and stop cost and a running cost of each of the electric power distribution stations in accordance with the calculated electric power distribution period and the amount of power supply demand. A method of controlling distributed electric power generation according to the present invention is characterized by comprising: an information acquisition step of acquiring information on an electric power distribution period used to calculate a period during which electric power supply is needed upon an interruption of electric power supply from an external power source in order to supply electric power to a plurality of demand loads connected to a power transmission grid network with a plurality of electric power distribution stations that can generate electric power upon the interruption of the external power source and acquiring an amount of power supply demand to be supplied via the power transmission grid network during the period during which electric power supply is needed, the period being determined from the acquired information on the electric power distribution period; and a selection step of selecting a less costly combination of one or a required number of electric power distribution stations for supplying electric power to the plurality of demand loads as electric power generation facilities based upon a start and stop cost and a running cost of each of the electric power distribution stations in accordance with the calculated electric power distribution period and the amount of power supply demand.

Advantageous Effects of Invention

According to the embodiments of the present invention, there can be provided a distributed electric power generation system that can reduce a running cost through selective control of electric power generators to be operated that achieve an increased efficiency of distributed electric power generation that covers a predetermined grid, as compared to existing systems, and a method of controlling such a distributed electric power generation system.

BRIEF DESCRIPTION OF THE DRAWINGS

FIG. 8A is a diagram illustrating the amount of demand in each of the demand loads.

FIG. 8B is an explanatory diagram illustrating a system configuration in a case where pairs of the electric power generation facilities being operated and groups of the demand loads are derived.

FIG. 10 is an explanatory diagram showing schedule table information illustrating a determined system configuration for each unit of time according to Embodiment 4.

FIG. 11 is an explanatory diagram showing demand prediction table information illustrating a list of electric power demand predictions that is used to determine a system configuration for each unit of time according to Embodiment 4.

FIG. 12 is an explanatory diagram showing reasonability determination table information illustrating results of determining the reasonability as possible system configurations based upon an operation rule in order to determine a system configuration for each unit of time according to Embodiment 4.

FIG. 13 is an explanatory diagram showing results of selecting a combination that achieves a lower cost according to the amount of power supply demand (predicted demand) during the electric power distribution period (the operating unit of time) for each of the reasonable system configurations when a system configuration for each unit of time is to be determined according to Embodiment 4.

FIG. 16 is an explanatory diagram showing schedule table information illustrating a determined system configuration for each unit of time according to Embodiment 5.

FIG. 17 is an explanatory diagram showing reasonability determination table information illustrating results of determining the reasonability as possible system configurations based upon an operation rule in order to determine a system configuration for each unit of time according to Embodiment 5.

FIG. 18 is an explanatory diagram showing results of selecting a combination that achieves a lower cost according to the amount of power supply demand (predicted demand) during the electric power distribution period (the operating unit of time) for each of the reasonable system configurations when a system configuration for each unit of time is to be determined according to Embodiment 5.

FIG. 20 is an explanatory diagram showing schedule table information illustrating determined system configurations for each unit of time according to Embodiment 6.

FIG. 21 is an explanatory diagram showing reasonability determination table information illustrating the results of determining the reasonability as possible system configurations based upon an operation rule when a system configuration for each unit of time is to be determined according to Embodiment 6.

FIG. 22 is an explanatory diagram showing selection result table information illustrating results of selecting a combination that achieves a lower cost according to the amount of power supply demand (predicted demand) during the electric power distribution period (the operating unit of time) for each of the reasonable system configurations when a system configuration for each unit of time is to be determined according to Embodiment 6.

MODE(S) FOR CARRYING OUT THE INVENTION

Several embodiments of the present invention will be described below with reference to the drawings. Ideas described in each of the embodiments may properly be combined with ideas of other embodiments. Thus, those ideas can be combined with each other as needed.

Embodiment 1

Figure 1:
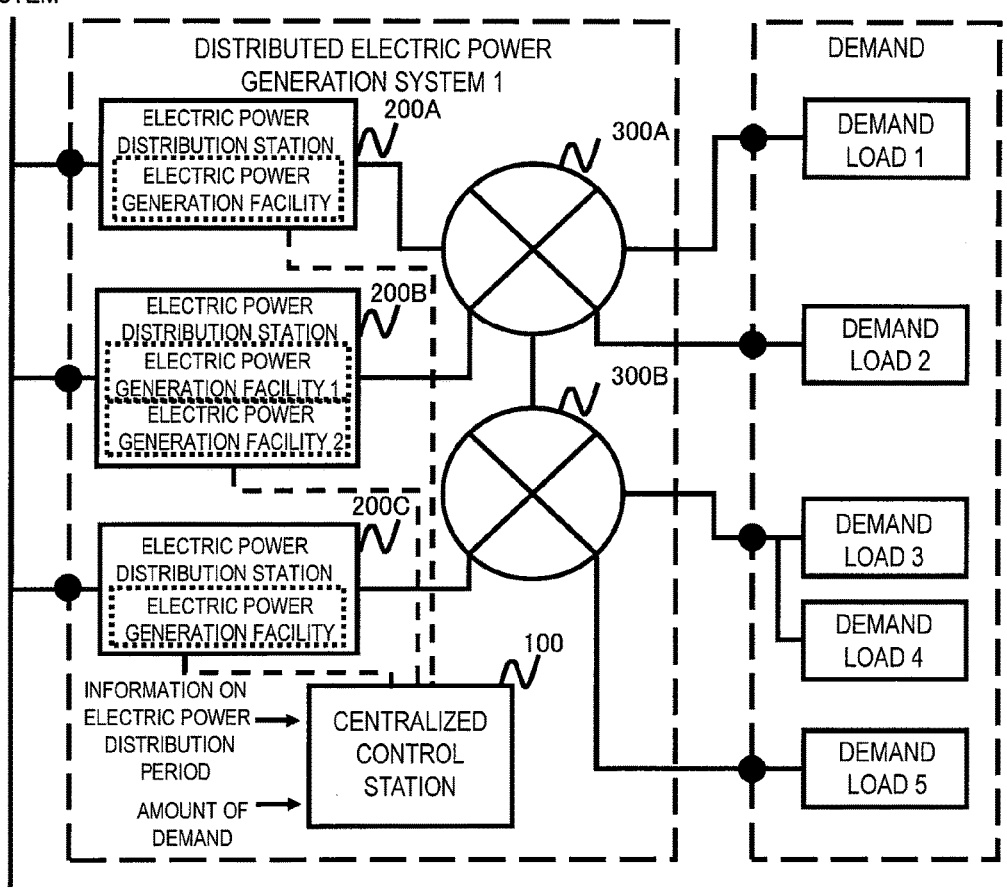
FIG. 1 is a system configuration diagram showing a distributed electric power generation system according to Embodiment 1.

FIG. 1 is a system configuration diagram showing a distributed electric power generation system according to Embodiment 1.

The distributed electric power generation system 1 illustrated in FIG. 1 can supply electric power to a plurality of demands (demand loads) present in a predetermined grid (also referred to as a sector or a cell) from a plurality of electric power generation facilities along with a commercial power supply.

As illustrated, the distributed electric power generation system 1 includes a centralized control station 100, a plurality of electric power distribution stations 200 (200A-200C), and power transmission grid networks 300 (300A, 300B). The distributed electric power generation system 1 is connected to a commercial power system as an external power source and demand loads located at various places within a managed area. In FIG. 1, the demand loads 1, 2, . . . represent consumers who consume distributed electric power, such as houses, buildings, schools, and hospitals.

The role of the centralized control station 100 is to supply electric power to demand loads connected to the system (demands for power supply upon a power cut) at a low cost when the commercial power supply is interrupted.

Therefore, the centralized control station 100 collects and acquires information on electric power at various places, which includes at least information on an electric power distribution period and the amount of power supply demand. Then the centralized control station 100 instructs or operates various places in the system individually or collectively on control of the electric power generation, regulation of demands, switching of the systems, or the like. For system operation at that time, one or a required number of electric power distribution stations (electric power generation facilities or electric power generation means) are selected and operated to reduce the total running cost during an electric power interruption period of the commercial power system in accordance with the electric power interruption period and the amount of power supply demand that meets the demands during the interruption period. For the collection of the information, the information may directly be collected via an information network, or an input may be received artificially. Furthermore, the interruption period or the amount of demand may be calculated and processed in the centralized control station 100 by prediction or estimation, and the acquired information may be used. The information network may be formed by a wired or wireless communication network. Furthermore, a power line may be used for communication.

The electric power distribution stations 200 can receive power supply from the commercial power system as an external power source and distribute it to the demand loads. Additionally, each of the electric power distribution stations 200 includes one or more electric power generation facilities (electric power generation means) therein and can distribute the generated electric power to the demand loads. The external power source may be power supply from another adjacent grid or the like other than the commercial power system. Each of the electric power distribution stations 200 may include a plurality of electric power generation facilities as in the electric power distribution station 200B. Each of electric power generation facilities installed in one electric power distribution station 200 may be managed by the centralized control station 100 or may integrally be managed at the electric power distribution station.

Each consumer or a manager of the distributed electric power generation system 1 installs the electric power generation facilities. Thus, the electric power generation means in each of the electric power distribution stations 200 is prepared so that it can be operated upon a power cut.

The electric power generation facility in each of the electric power distribution stations 200 can employ a general emergency power supply facility or a facility used for a hybrid electric power generation facility. Examples of such facilities include a diesel generator, a battery, a fuel cell, a gas turbine generator, a steam turbine generator, a biomass generator, and the like. The electric power generation facility may include a facility that continuously generates and distributes electric power to demand loads, such as a solar power generation facility, a wind power generation facility, and a hydraulic power generation facility. Those electric power generation means are provided merely by way of example and are not intended to limit the electric power generation means.

Each of the electric power distribution stations 200 provides a connection point where electric power is bought from a general electric power company. Any mechanism for selling electric power may be provided as needed. Furthermore, any mechanism for interchanging electric power with other distributed electric power generation systems (other sectors or cells), which may be external power sources, may be provided as needed.

The electric power distribution to the demands by each of the electric power distribution stations 200 may not be synchronized with the commercial power supply. For example, electric power may be supplied to the demands at a frequency different from that of the commercial power supply. Electric power may be supplied with different types of currents (AC or DC) or with different voltages. For example, when the commercial power system is an alternating-current power source, each of the electric power distribution stations 200 may be configured to receive electric power from the commercial power system via AC/AC conversion or AC/DC conversion.

The power transmission grid networks 300 are connected to the electric power distribution stations 200 and the demand loads. The power transmission grid networks 300 supply electric power received from the commercial power supply or the electric power distribution stations 200 to the demands using electric power (demand loads).

In short, the power transmission grid networks 300 may be formed only by electric power distribution lines having no controlled parts. The power transmission grid networks 300 may include a transformer or a breaker. On the other hands, the power transmission grid networks 300 may be configured to change electric power distribution paths such that the electric power distribution stations 200, the demand loads, and the system can be separated. The electric power distribution paths may be switched by operation of a relay or the like. FIG. 1 shows a power transmission grid having two separated systems (300A and 300B).

As illustrated, the power transmission grid networks 300 are connected to the electric power distribution stations 200. The power transmission grid networks 300 supply electric power received from the commercial power system and/or any or all of the electric power distribution stations 200 to one or more demand loads using electric power.

The power transmission grid networks 300 may be controlled by the centralized control station 100 or by each of the electric power distribution stations 200. Furthermore, a human may switch the paths based upon instructions issued by the centralized control station 100. Now an example of the configuration of the centralized control station 100 will be described.

Figure 2:
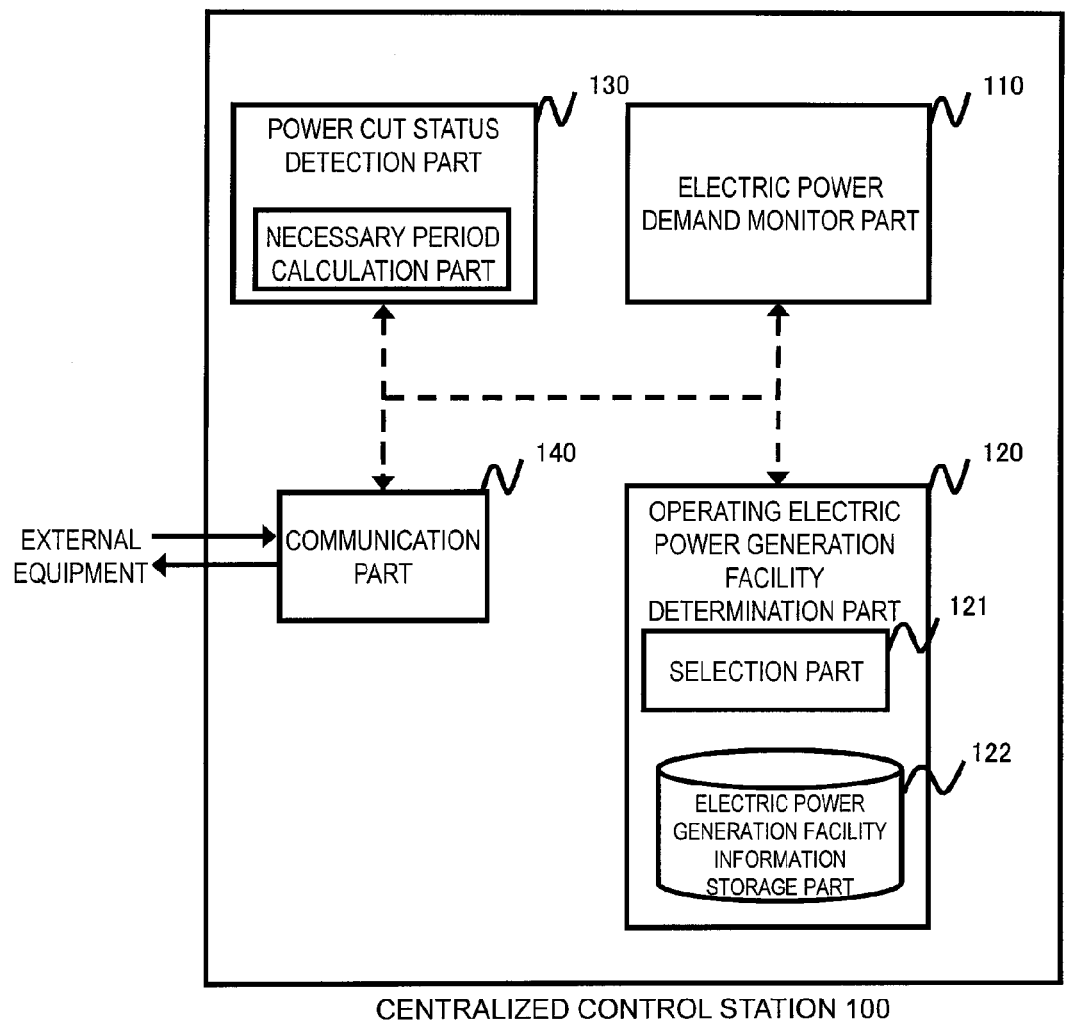
FIG. 2 is a configuration diagram of a centralized control station 100 according to Embodiment 1.

FIG. 2 is a configuration diagram of the centralized control station 100 according to the present embodiment. As illustrated in FIG. 2, the centralized control station 100 includes an electric power demand monitor part 110, an operating or active electric power generation facility determination part 120, a power cut status detection part 130, and a communication part 140.

In this configuration example, all information is received from and transmitted to the information network via the communication part 140. The communication means is not limited to one type. Power line communication, wireless communication, or wired communication may properly be used depending upon the system configuration to be constructed.

The electric power demand monitor part 110 continuously monitors electric power demands at the demand loads (consumers), calculates the total demand, and notifies the operating electric power generation facility determination part 120 of the total demand, which is an aggregated total of the monitoring results. The total demand is the amount of electric power that needs to be supplied at the present time. In other words, the total demand is electric power consumption of all of the demand loads under the direction of the system. The amount of power supply demand right after the present time and during the electric power distribution period can be estimated based upon this total demand. Furthermore, the amount of power supply demand may be estimated or predicted precisely by the use of various kinds of data which have already been collected and which serve to estimate electric power variations during each of time periods. Moreover, the electric power demand monitor part 110 may perform acquisition (notification, estimation, or prediction) of the amount of power supply demand separately for each of the electric power distribution stations or each of the demand loads and notify the operating electric power generation facility determination part 120 of the amount of power supply demand.

The operating electric power generation facility determination part 120 acquires information on the electric power flows of the electric power distribution stations 200 (whether the system power supply is used, whether electric power generation means is used, or the like) via the communication part 140 and determines electric power generation means to be operated (and outputs or power transmission paths as needed) with use of a selection part 121. Furthermore, the operating electric power generation facility determination part 120 notifies the electric power distribution stations 200, the power transmission grid networks 300, or the like of information for allowing them to perform an operation being required based upon the determination via the communication part 140 and performs a remote operation of the electric power distribution stations 200, the power transmission grid networks 300, or the like. For example, the operating electric power generation facility determination part 120 notifies the electric power distribution stations 200, the power transmission grid networks 300, or the like of start/stop commands for the electric power generation facilities, indication for output values, instructions for switching the networks, and the like. The electric power generation facility information storage part 122 stores information on all of the electric power distribution stations 200 (all electric power generation means) under the direction of the system. The information stored in the electric power generation facility information storage part 122 includes the maximum output capacity of each of the electric power generation facilities, values of power generation outputs that cause low efficiency and high efficiency (low efficiency threshold and high efficiency threshold), operating conditions (ON/OFF of the electric power generation facilities), power generation outputs, voltages, power factors, and frequencies of facilities being operated, and the like. The electric power generation facility information storage part 122 also stores information on a start cost, a stop cost, and a running cost of each of the electric power generation facilities as cost information. This information may be held as start-operation cost curve data indicating cost variations with time. This information may be stored as a function having a variable of a fuel cost or the like. With this configuration, an actual cost of the fuel cost during a power cut can be calculated, and comparison for selecting electric power distribution stations 200 (electric power generation means) to be operated is facilitated. This information is transmitted to the selection part 121 and used to determine electric power distribution stations 200 (electric power generation means) to be operated.

When the power supply from the commercial power supply is interrupted, the power cut status detection part 130 detects such a situation via the electric power distribution stations 200 and the communication part 140.

Furthermore, when the commercial power supply is interrupted, the power cut status detection part 130 acquires a necessary operation period (predicted power cut period) during which necessary electric power for demands is supplied through electric power generation within the distributed electric power generation system 1 and notifies the operating electric power generation facility determination part 120 (selection part 121) of the value. This necessary operation period is first determined by an estimated period of time in which power supply from the commercial power supply is recovered. On the other hand, the necessary operation period may be made shorter or longer depending upon the period of time in which power supply is recovered.

For the estimation process of the necessary operation period, the power cut status detection part 130 acquires information on an electric power distribution time used as a basis for identifying the necessary operation period before or immediately after a power cut. The information on an electric power distribution time may use information (power supply interruption period information) defining a period of time during which power supply is interrupted, which is used to calculate a period of time required for power supply (necessary operation period), or information (electric power distribution period information) defining a period of time to carry out electric power distribution.

The power supply interruption period information (predicted power cut period or expected power cut period) is received from an electric power company, a human (administrator), or the like. For example, the electric power distribution period information may be received from a database of past similar power cuts or human (administrator) other than an electric power company.

For example, the information on the electric power distribution time may be defined so as to specify a time period in a day or may be defined so as to specify that power supply is interrupted until a specific point of time (electric power is distributed from a specific point of time). Furthermore, the information on the electric power distribution time may be defined so as to specify a one-hour period from the present time or the like.

In preparation for a case where power supply from the commercial power supply is interrupted for some reason, like a usual power cut, it is preferable for the centralized control station 100 to continuously acquire the status and demand of each of the electric power distribution stations 200 through observation. It is also preferable for the centralized control station 100 to have a database of demands varying with time (for example, maximum values/average values in a day, a week, a year, or a season), calculate an estimated value of electric power being used (demand), and determine a rate of spare. Furthermore, when a different rate of spare is set for each of the systems (each group of consumers), a desired degree of stability can be achieved at a lower cost. Furthermore, pre-collection and use of a database of demands required upon a power cut (for example, maximum values/average values in a day, a week, a year, or a season) is effective in calculating an estimation value (prediction value) of the required amount of electric power generation. On the other hand, electric power demands immediately after a power cut can be estimated based upon electric power demands immediately before the power cut. Therefore, the estimation value may be calculated by simply adding a rate of changing demands.

The operating electric power generation facility determination part 120 (selection part 121) immediately identifies a power cut state and calculates a required amount of electric power generation for each demand load. With respect to the electric power distribution stations 200 (electric power generation means) that can generate a calculated amount of power efficiently, the operating electric power generation facility determination part 120 (selection part 121) performs a derivation process of a combination of the electric power distribution stations 200 that allows the calculated necessary operation period to fall within a desired range of a fuel cost or a cost rate and selects electric power distribution stations 200. At that time, according to start costs, stop costs, and running costs of individual electric power distribution stations 200 (individual electric power generation means), one or a required number of electric power distribution stations 200 (electric power generation means) that can reduce the total running cost during the power supply interruption period is derived for the selection process. In the selection process of the present embodiment, a minimum number of electric power generation facilities that can cover the amount of power supply demand within a certain range of efficiency can be selected.

Next, an operation of the centralized control station 100 when power supply from the commercial power supply is interrupted for a sudden reason caused by troubles of high-voltage transmission lines or the like will be described as a more specific example.

With the current electric power systems, when power supply from an electric power company is interrupted for some reason, a company or a facility manually or automatically activates its electric power generation facility as an emergency electric power source. Thus, each of consumers generates electric power and covers its requiring electric power. Furthermore, a plurality of buildings of a company, a university, or the like shares an emergency electric power generation facility in some cases.

On the other hand, in the distributed electric power generation system 1, the centralized control station 100 manages operations of the electric power generation means arranged in a distributed manner as described above.

Figure 3:
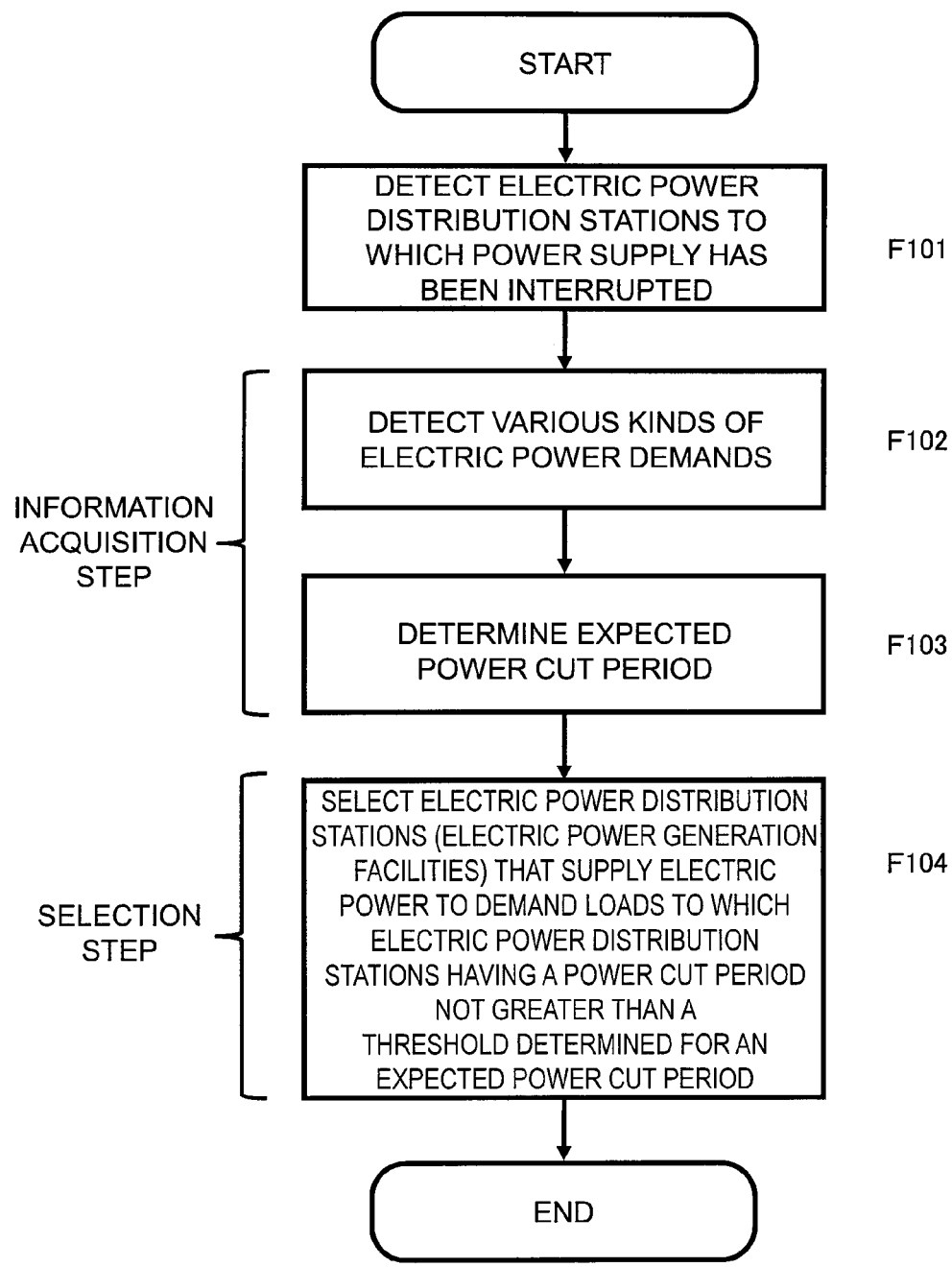
FIG. 3 is a flow chart explanatory of an operation example of the centralized control apparatus 100 according to Embodiment 1 in a case where the centralized control apparatus 100 detects a power cut.

FIG. 3 is a flow chart explanatory of an operation example of the centralized control apparatus 100 in a case where the centralized control apparatus 100 detects a power cut.

First, the centralized control apparatus 100 (power cut status detection part 130) detects a place where a power cut has been detected, i.e., electric power distribution station 200 to which power supply is interrupted (F101). In most of usual cases of a wide-area power cut, power supply to a plurality of electric power distribution stations 200 is simultaneously interrupted. On the other hand, in a case of troubles of transmission systems, electric power distribution stations 200 to which power supply has been interrupted are limited. Therefore, when a power cut occurs in only one electric power distribution station 200, it can be doubted that a local accident causes the power cut. The centralized control apparatus 100 may directly detect the status of the commercial power supply to monitor a power cut. Furthermore, in a case of a rotational interruption system, electric power distribution to any area specified by a power company is interrupted. Thus, electric power to some electric power distribution stations 200 is interrupted while electric power to other electric power distribution stations 200 is not interrupted.

Next, the power cut status detection part 130 acquires electric power demands required for each or all of the electric power distribution stations 200 via the electric power demand monitor part 110 of the centralized control station 100 (F102). At that time, a predicted power cut period (necessary operation period) is determined from the type of the power cut (F103). For example, when an electric power company or the like has announced a power supply interruption plan, a predicted (expected) power cut period (necessary operation period) is acquired from the plan. The power cut period may be determined by prediction from a past history, prediction based upon information from other areas within the same jurisdiction, or the like. The information on electric power distribution is used for a start/stop plan (selection process) of the electric power generation facilities.

Then the operating electric power generation facility determination part 120 determines operating electric power generation facilities for demand loads under the direction of the system with respect to electric power distribution stations (electric power generation facilities) for which power cut periods (necessary operation period) determined in F103, are not greater than a predetermined threshold (F104). If a plurality of electric power generation facilities are provided for one electric power distribution station (e.g., the electric power distribution station 200B), the aforementioned process may be performed while individual electric power generation facilities are regarded as electric power distribution stations. This also holds true for the following embodiments.

Here, an arithmetic processing example of determining electric power generation facilities to be operated will be described with diesel generators, which are typical electric power generation facilities of many electric power generation means. The following description illustrates a scheme in which the centralized control station 100 determines whether or not an existing emergency power source facility (diesel generator) installed in an electric power distribution station 200 is energized upon a power cut.

When the diesel generator starts and stops, it requires fuel three times to five times fuel required for a rated operation or even more. Therefore, from the viewpoint of the cost, it should be avoided to frequently turn on and off a generator because of a short-term power cut. In the following description, the unit of the operating cost is represented by the Japanese currency unit [Yen]. The unit of the operating cost may employ any reference unit, such as a local currency unit, in a desired manner.

The threshold (T [minutes]) of the power cut period is calculated from comparison of the fuel cost [Yen] at the time of the start. For example, it is assumed that the fuel cost at the time of a normal operation to output a desired electric power is 10 Yen/minute. If a required output per minute at that time of the start becomes five times, the fuel cost at the time of the start can be calculated as 50 Yen/minute. Therefore, assuming that a period of time from the start until a normal operating state (start time) is five minutes, the fuel cost required for the start is 250 Yen.

At that time, assuming that the power cut period is t [minutes], the operating fuel cost during the power cut period is 10 t [Yen]. The operating period for which the start cost and the operation cost are equal to each other is t=25 minutes.

Then the operating electric power generation facility determination part 120 determines to supply electric power through other electric power generators and not to start this diesel generator if the power cut period threshold T is equal to or less than 25 minutes. The threshold T is variable according to the user's demand. For example, if the start cost needs to be 50% of the operation cost or less, the start cost should be reduced to 10 t×0.5 or less. In this example, the power cut threshold is 50 minutes. Thus, the threshold T can be varied in any way.

When the power cut period is long or when the amount of demand is larger than a predetermined threshold, the operating electric power generation facility determination part 120 determines to operate power generators installed in an electric power distribution station connected directly to each of power loads as with the normal operation of the existing emergency power source facility.

Furthermore, even if the power cut period is equal to or shorter than the power cut period threshold, the operating electric power generation facility determination part 120 determines to supply electric power through one (or a few) electric power generation facilities for a plurality of power loads when the total demand is equal to or smaller than a threshold of demands that can be covered by one (or a few) power generators.

Figure 4:
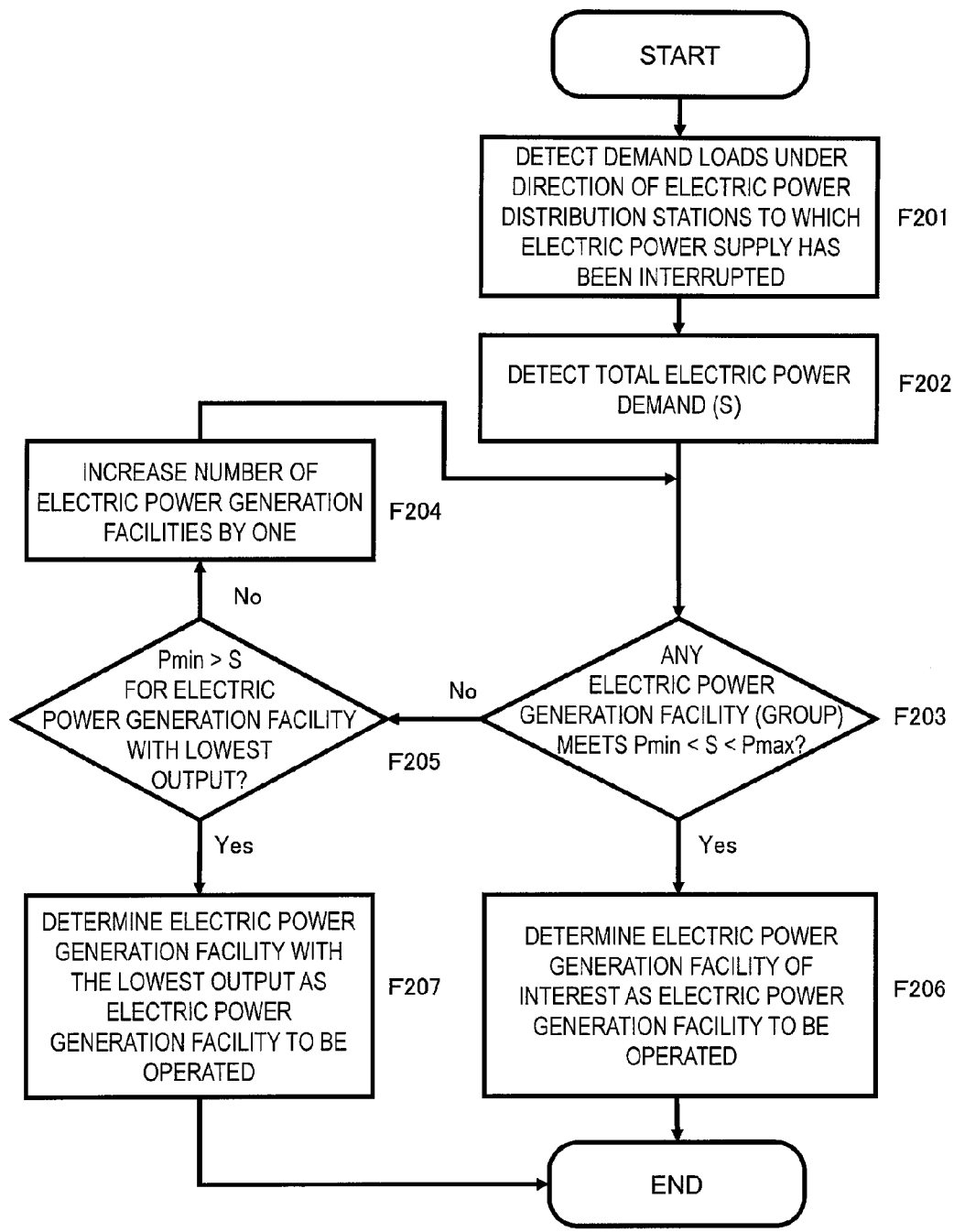
FIG. 4 is a flow chart for determining electric power generation facilities to be operated for power loads under the direction of an electric power distribution station having a power cut period that is equal to or shorter than a power cut period threshold according to Embodiment 1.

FIG. 4 is a flow chart for determining electric power generation facilities to be operated for power loads under the direction of an electric power distribution station having a power cut period that is equal to or shorter than the power cut period threshold. In this example, the operation is described as an internal processing of the centralized control station 100. However, this operation may be performed in a distributed manner in each of the electric power distribution stations 200 or the consumers.

The start timing of a power cut may differ from one electric power distribution station to another by several seconds to several minutes. In such a case, the timing may be adjusted so as to await the start of a power cut of another electric power distribution stations to conform to the system. Furthermore, in response to the start of a power cut of each of the electric power distribution stations, a demand load that needs power distribution may be detected each time. Some electric power distribution stations may suffer from a power cut while other may not. According to the present invention, even in such a case, electric power generation facilities in electric power distribution stations that do not suffer from a power cut are operated so as to achieve a lower cost.

First, the power cut status detection part 130 detects demand loads to which power supply is interrupted due to a power cut and an electric power distribution period (power cut period) in an information acquisition step (F201). Next, the electric power demand monitor part 110 calculates the total electric power demand (S) to be used by the detected demand loads in the information acquisition step (F202). The total electric power demand (S) is the amount of demand of all demand loads within a predetermined grid at that time when external power supply is interrupted to all of the electric power distribution stations 200. On the other hand, when only part of the electric power distribution stations 200 suffers from a power cut, the total electric power demand (S) is the amount of demand of demand loads to which electric power is transmitted from those electric power distribution stations 200 at that time. Furthermore, if demands or equipment limitations can be recovered by switching the power transmission grid networks 300 from other electric power distribution stations 200, then such a method may be used preferentially. The total electric power demand (S) may be managed with separated units of time. Furthermore, it is preferable to consider an expected amount of change during an estimated power cut period, in addition to the total electric power demand at the present time. Particularly, a maximum demand during an estimated power cut period should be considered.

Next, the operating electric power generation facility determination part 120 seeks for one electric power generation facility that can meet the total electric power demand (S) calculated within a predetermined output range from the electric power generation facility information storage part 122 (F203).

Here, the predetermined output range refers to an output range in which an operating cost such as a fuel cost of an electric power generation facility is lower than a threshold (cost threshold) and has a minimum value of Pmin and a maximum value of Pmax. This range varies depending upon the electric power generation facilities. Generally, when an output of a diesel generator is lowered, a fuel efficiency is also lowered. For example, when the amount of fuel consumption at a rated output is L [litters/hour] per 1 kWh, the amount of fuel consumption at an output of 50% to 100% is 1.0–1.05×L [litters/hour] per unit kWh. However, when the output falls below 50%, the amount of fuel required per unit kWh increases to 1.2 L [litters/hour]. When the output falls below as low as 30%, the amount of fuel required per unit kWh increases to 2.0 L [litters/hour]. An increased amount of fuel consumption leads to an increased fuel cost. A cost curve based upon a starting cost and a running cost of an individual electric power generation facility also varies depending upon the type of the electric power generation facility and the temperature. Therefore, a cost curve may be obtained beforehand or accumulated by data collection during the operation.

The minimum value is set in consideration of those facts. In an example of a diesel electric power generation facility having the aforementioned characteristics, Pmin may be set to be 50%. With regard to the maximum value Pmax, it is important to consider an excess amount of electric power generation (rate of spare) in the case where the amount of electric power being demanded suddenly increases, apart from the fuel cost, in order to set Pmax.

Furthermore, with regard to the power cut period threshold, more accurate cost calculation can be made by considering a fuel cost curve obtained by an output of an electric power generation facility in order to set the threshold.

In the foregoing description, a power cut period threshold is determined on the assumption that an output of a power generator is 100%. However, when an output of a power generator is taken into account, a threshold during a power cut period may change. In the above example, the power cut period threshold T is 25 minutes. In a case where a demand load is 30%, the amount of fuel required doubles. Accordingly, the operating electric power generation facility determination part 120 determines that the power cut threshold is 12.5 minutes. In other words, the operating electric power generation facility determination part 120 sets the threshold as a solution derived from considerations of the total electric power and the demand rate.

When an electric power generation facility that can meet such conditions can be set, the operating electric power generation facility determination part 120 determines that electric power generation facility as an electric power generation facility to be operated (F206). If a plurality of electric power generation facilities meet such conditions, the operating electric power generation facility determination part 120 may make a determination so as to disperse the number of operations or the operation periods by changing electric power generation facilities with reference to the operation history in order to avoid a concentrated operation. Alternatively, the operating electric power generation facility determination part 120 may select a combination that minimizes a fuel efficiency, i.e., a fuel cost. There are two load conditions that take No at F203. One is a load condition in which one electric power generation facility cannot cover because the total electric power demand (S) is too large. The other is a load condition in which the total electric power demand (S) is too small to meet an appropriate output range of any electric power generating apparatus. In this case, the operating electric power generation facility determination part 120 compares the total electric power demand (S) with Pmin of an electric power generating apparatus having the lowest output to determine whether the total electric power demand (S) is smaller than Pmin (F205). As a result, if the total electric power demand (S) is smaller than Pmin, the operating electric power generation facility determination part 120 determines that an electric power generation facility having the lowest output that can achieve the highest cost efficiency is to be operated (F207). If information indicative of the output-fuel cost can be obtained, the operating electric power generation facility determination part 120 can select an electric power generation facility having the highest cost efficiency rather than selecting an electric power generation facility having the lowest output. On the other hand, if the determination at F205 shows No, the total electric power demand (S) is too large. Therefore, the operating electric power generation facility determination part 120 increases the number of electric power generation facilities to be operated (F204), and the determination process of F203 is performed again with a combination of those electric power generation facilities. This process is properly repeated to set the number of electric power generation facilities so as to cover the demands. The aforementioned flow may be changed appropriately according to the characteristics of the electric power generation facilities.

After one or more electric power generation facilities to be operated have been determined, the selection part 121 of the operating electric power generation facility determination part 120 sends an operation command to an administrator of the electric power generation facilities (equipment of the electric power distribution stations 200) to be operated or the electric power distribution stations 200 via the communication part 140. Furthermore, a remote operation command or a switching command is sent to switch the power transmission grid networks 300 to connect the selected electric power distribution stations to the respective demand loads.

The foregoing description does not consider any electric power generation facility (battery facility, solar power generation facility, or the like) that consumes no fuel. The determination process may be configured to manage electric power generation facilities that consume no fuel in parallel to the aforementioned electric power generation facilities that consume fuel.

Furthermore, the determination process may be configured such that, after electric power generation facilities start to be operated, electric power generation facilities of other electric power distribution stations are switched into a load mode (for example, battery facilities are switched into a charge mode) so as to conform with a cost curve of the electric power generation facilities being operated and are managed as demand loads. Additionally, in order to suppress the current, the electric power generation facilities may be set into a load mode, or battery facilities may be set into a charge mode.

Thus, electric power generation facilities to be operated are selected by the centralized control station 100. Accordingly, the fuel cost can be suppressed against load variations after the determination of the electric power generation facilities to be operated. Furthermore, improvement of power factors and regulation of demands can be achieved so that the fuel cost is further reduced.

Furthermore, the centralized control station 100 may calculate, as a consumption cost, a power transmission loss caused by power distribution interchange between electric power distribution stations and add it to the aforementioned fuel cost.

Furthermore, the centralized control station 100 may hold start-operation cost curve data indicating cost variations of individual electric power distribution stations 200 (electric power generation facilities) with time beforehand, compare the start-operation cost curves of the individual electric power distribution stations 200 with each other, and select electric power distribution stations to be operated depending upon the elapse of time.

Moreover, when the demands greatly vary during the power cut period and deviate from a range in which the outputs of the electric power generation facilities being operated are at a high efficiency level, the centralized control station 100 may change the electric power generation facilities being operated. At that time, the electric power generation facilities being operated may be changed so that the total cost is improved in consideration of the start cost and the stop cost.

For example, it is assumed that the demand decreases from 500 kW to 100 kW with time. In this case, if the operating electric power generation facility determination part 120 determines that power generators having a given output range from 300 kW to 700 kW are electric power generation facilities to be operated, then the present demand (500 kW) is between high-efficiency thresholds (Pmax and Pmin) However, if a power generator having a rated output of 500 kW is continuously used while the demand decreases to 100 kW with time, then the output becomes 20%. As a result, the demand falls out of the high-efficiency range (equal to or less than Pmin) Therefore, when the operating electric power generation facility determination part 120 detects that the demand has moved out of the high-efficiency threshold range of the electric power generation facilities being operated (equal to or less than Pmin), it performs a resetting process of the electric power generation facilities to be operated. This resetting process of the electric power generation facilities to be operated can improve the total cost in consideration of the start cost and the stop cost. As a result, when the power cut period is so long that a wasting cost is greater than a cost relating to the start and stop of the electric power generation facilities, the power generators being operated are changed, for example, from a power generator having a rated output of 500 kW to a power generator having a rated output of 200 kW or less. This also holds true for not only a case of one power generator being operated, but also a case of a plurality of power generators being operated. Similarly, when the operating electric power generation facility determination part 120 detects that the demand has moved out of the high-efficiency threshold range of the electric power generation facilities being operated (equal to or more than Pmax), it performs a resetting process of the electric power generation facilities being operated. As a result, even when the demand increases from 500 kW to 1000 kW with time, electric power generation facilities being operated are determined so that the total cost is reduced in consideration of the start and stop cost. Similarly, when the demand decreases with time and becomes equal to or less than the high-efficiency threshold range (Pmin), a resetting process of the electric power generation facilities being operated is performed so that the total cost is reduced in consideration of the start and stop cost.

In Embodiment 1, if the total power load cannot be covered by one power generator, a parallel operation is performed with a plurality of power generators. In the parallel operation, the operating electric power generation facility determination part 120 derives a system configuration in which a plurality of power generators are connected to the power transmission grid network 300 (300A or 300B) and operates the power generators and various types of switches at managed timing. Therefore, the start of operation of the power generators is synchronized such that the start of operation of the power generators and the connection of the power generators to the power transmission grid network 300 are carried out one by one. Furthermore, the connection of the power loads to the power transmission grid network 300 is carried out one by one so that the electric power quality is not degraded. In this manner, the operating electric power generation facility determination part 120 determines balanced control between the generated electric power and the demand connected to the power transmission grid network 300 with reference to a cost of fuel that is actually consumed by the diesel generators.

According to the present embodiment, demands connected to a distributed electric power generation system 1 can be covered at a lower cost with respect to a currency unit by a minimum number of electric power distribution stations 200 (electric power generation facilities) being operated. This efficient operation of electric power generation facilities allows overhead costs, for example, costs relating to turning on and off the power generators, to be reduced. Therefore, the running cost can be reduced.

Embodiment 2

In the present embodiment, when a power cut is detected by the distributed electric power generation system, a plan to determine how to supply electric power to power loads connected in a usual state is determined in each of the electric power distribution stations. Therefore, a distributed control station including the aforementioned centralized control station 100 is provided in all or some of the electric power distribution stations 200.

The following determination process is performed by the selection part 121 of the operating electric power generation facility determination part 120.

Figure 5:
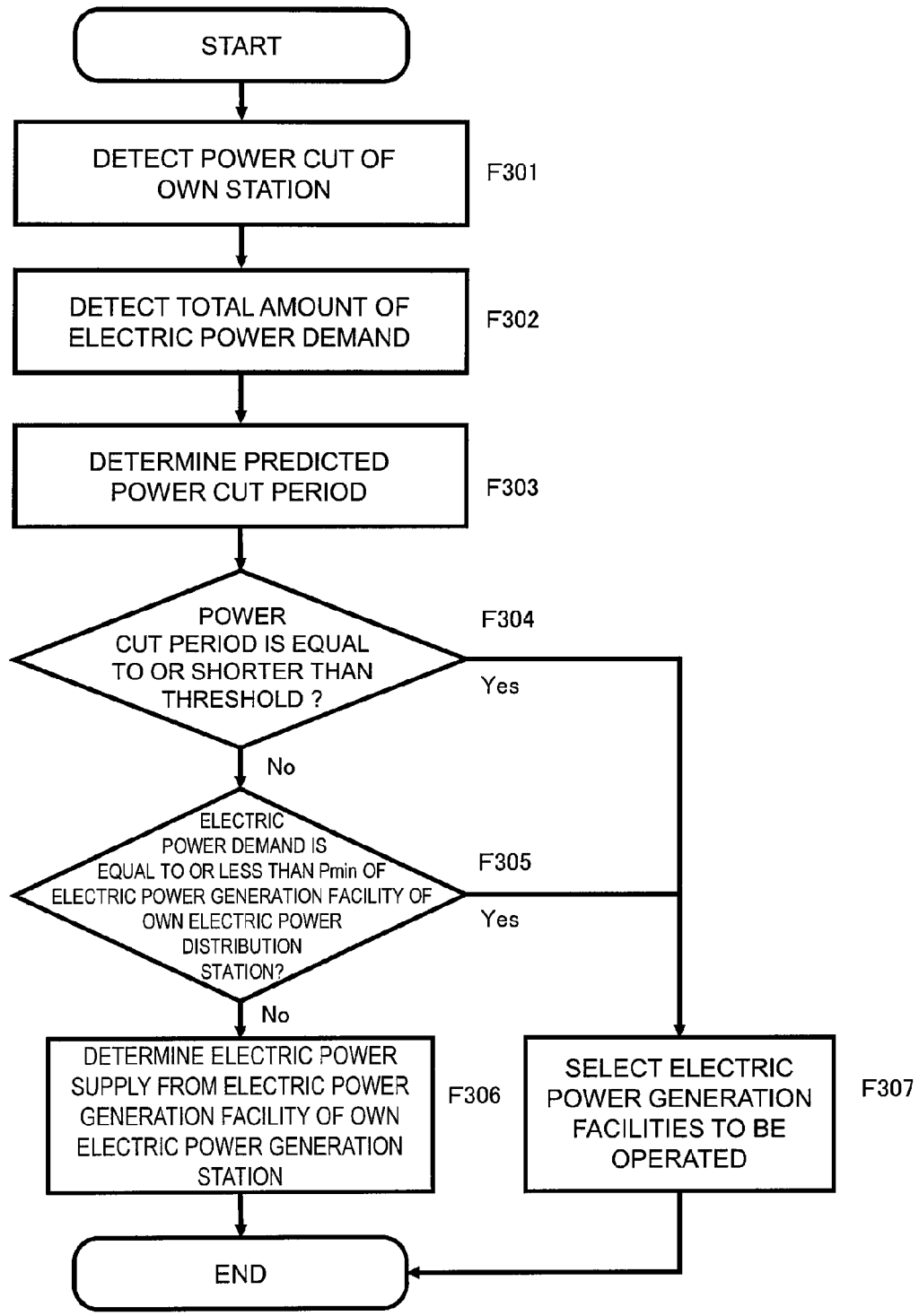
FIG. 5 is a flow chart explanatory of an operation example of a control station in a case where a power cut is detected in Embodiment 2.

FIG. 5 is a flow chart explanatory of an operation example of the operating electric power generation facility determination part 120 in a case where a power cut is detected in Embodiment 2.

The operating electric power generation facility determination part 120 detects a power cut (F301), then identifies an electric power demand (F302), identifies a predicted power cut period (F303), and determines whether or not the power cut period is equal to or shorter than a threshold (F304). If the power cut period is equal to or shorter than the threshold, a selection process of electric power generation facilities to be operated according to Embodiment 1 is performed in its own electric power distribution station 200, unlike existing power supply from an electric power generation facility installed in its own electric power distribution station 200 or another electric power distribution station 200 (i.e., supply under the direction of its own station).

This selection process determines that the electric power generation facilities of its own electric power distribution station 200 are selected as electric power generation facilities for supplying electric power to the demand loads so that its own station covers the demands, or that the station receives electric power supply from another electric power distribution station 200 to cover the demands.

Even if the power cut threshold is equal to or greater than the threshold, in a case where it is determined that the electric power demand of the demand loads to which electric power is being supplied is equal to or lower than the predetermined threshold (Pmin) of the electric power generation facilities of its own electric power distribution station 200 (F305), receiving electric power from an electric power generation facility of another electric power distribution station 200 is selected. In other words, if the demand is less than Pmin, the operating electric power generation facility determination part 120 supplies electric power to the demand loads not from an electric power generation facility of its own station, but from an electric power generation facility of another station. If the demand is greater than Pmin, the operating electric power generation facility determination part 120 supplies electric power to the demand loads from an electric power generation facility of its own station (F306).

Operations after the determination of electric power generation facilities to be operated (F307) are the same as those of Embodiment 1. At that time, various kinds of notifications are sent to other cooperating distributed control stations.

According to Embodiment 2, electric power supply from an electric power generation facility of another electric power distribution station is selected based upon the power cut period and the electric power demand, for example, when the electric power demand is small even in a case of a long-term power cut. With this configuration, a running cost such as a fuel cost at the beginning of the operation and during the operation can be reduced.

Embodiment 3

In the present embodiment, there will be described a method of detecting a power cut in a distributed electric power generation system and, when two or more electric power generation facilities are to be operated among three or more electric power generation facilities, switching power transmission grid networks into an operation mode that assumes individual single operations in each of the stations. When a plurality of electric power generation facilities are to be connected, a grid arrangement may be designed in which all of the loads are connected to a single large grid while the electric power generation facilities are operated in parallel. If the system includes, as an electric power generation facility, a rotation type power generator such as a diesel generator, it is difficult to perform a parallel operation while maintaining the phase or power factor in a satisfactory manner. Furthermore, if the types, the manufacturers, the capacities, and the like of the electric power generation facilities are different, the degree of difficulty increases.

Therefore, when the demand is covered by a plurality of electric power generation facilities being operated, a determination is made such that the total demand load is divided into the same number of groups as the electric power generation facilities being operated. Thus, the system is configured such that each of the electric power generation facilities supplies electric power to one group. Division and coupling of the groups may be achieved by using a group of switches in the power transmission grid network 300 between the electric power distribution stations and controlling the group of switches.

Figure 6:
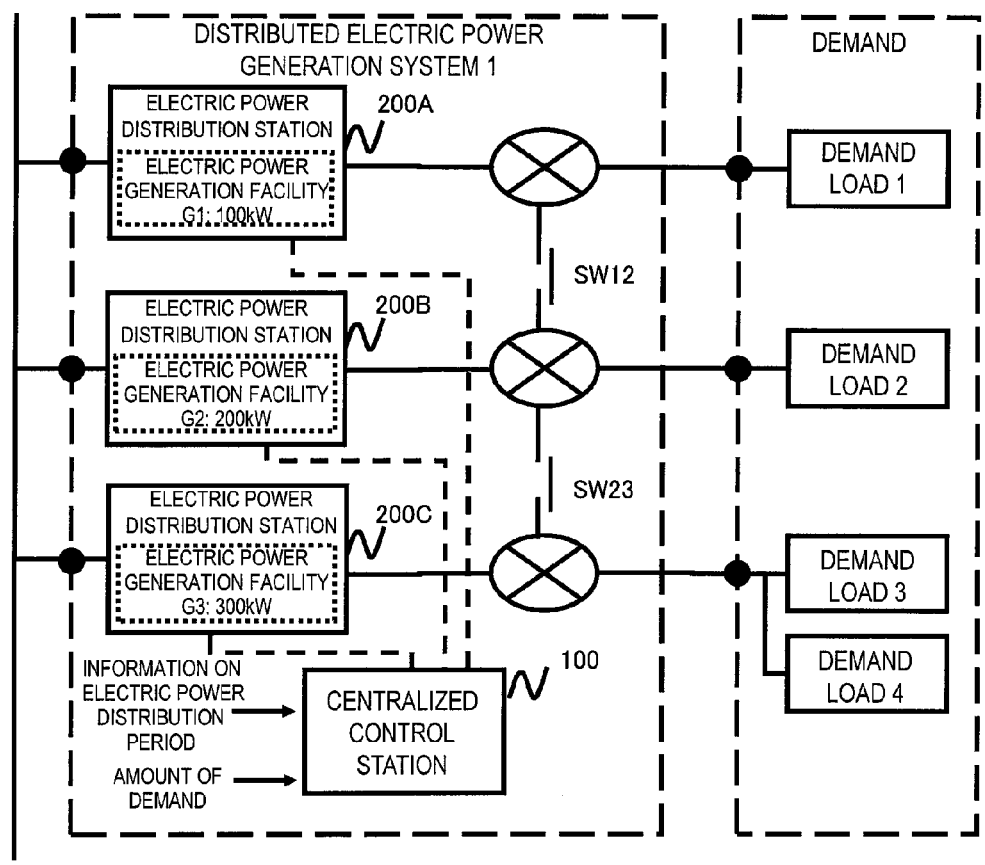
FIG. 6 is a system configuration diagram showing a distributed electric power generation system simplified to explain operations according to Embodiment 3.

FIG. 6 is a system configuration diagram showing a distributed electric power generation system simplified to explain operations according to the present embodiment. The electric power distribution stations 200 and the demand loads (1-4) are paired as a small grid configuration for a usual operation (when electric power is received from the commercial power system). The following description assumes three small grids (in which the demand loads 3 and 4 form one small group beforehand). Switches (such as a relay and a breaker; denoted by SW12 and SW23 in FIG. 6) are provided between the small grids. The rated outputs of the electric power generation facilities are 100 kW, 200 kW, and 300 kW, respectively. If the electric power distribution stations 200 are connected to each other at a plurality of points, the power transmission grid network 300 may be manipulated such that all of the related switches are operated when the electric power distribution stations 200 are disconnected from each other. In this example, an operating electric power generation facility determination part 120 is provided in the centralized control station 100 as with Embodiment 1. The distributed electric power generation system may be controlled by the electric power distribution stations 200 as with Embodiment 2. This also holds true for the subsequent embodiments.

Figure 7:
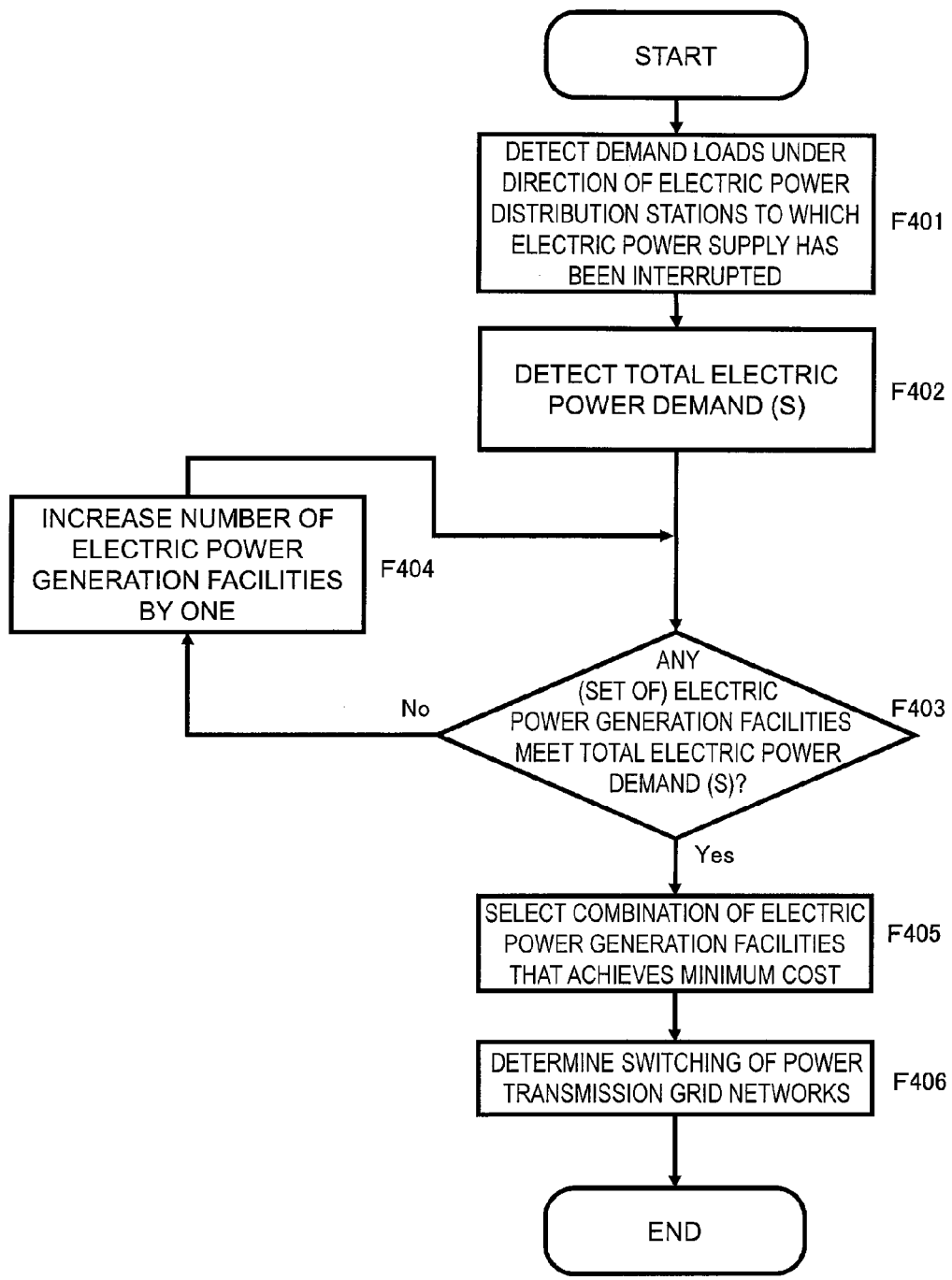
FIG. 7 is a flow chart showing an example operation of determining a system configuration for a group of power loads in Embodiment 3.

FIG. 7 is a flow chart showing an example operation of determining a system configuration for a group of power loads in Embodiment 3, i.e., an example operation of the aforementioned determination process of turning on and off the electric power generation facilities 1-3 and a group of switches.

Furthermore, FIG. 8A is a diagram illustrating the amount of demand in each of the demand loads. FIG. 8B is an explanatory diagram illustrating a system configuration in a case where pairs of the electric power generation facilities being operated and groups of the demand loads are derived.

When the operating electric power generation facility determination part 120 receives a power cut start notification from the power cut status detection part 130, it identifies the amount of demand in each of the loads from the electric power demand monitor part 110 (F401 and F402). As shown in FIG. 8A, the amounts of demand in the loads are 90 kW, 70 kW, and 150 kW, respectively. Therefore, the total electric power demand (S) is detected to be 310 kW.

Next, the operating electric power generation facility determination part 120 seeks for one electric power generation facility that can meet the total electric power demand (F403). In this example, however, the maximum rated output is 300 kW. Thus, no electric power generation facility meets the conditions (proceeding to No at F403).

Therefore, the operating electric power generation facility determination part 120 increase the number of electric power generation facilities that meet the total demand load by one (F404). Then the operating electric power generation facility determination part 120 seeks again for a combination of two electric power generation facilities that can meet the total demand load (F403).

The fact that two electric power generation facilities meet the demands at three points means that the power transmission grid networks 300 (three small grids) are grouped into two small grids. As shown in FIG. 8B, two grid groups can be produced by turning one of the switches SW12 and SW23 on and turning the other off.

To generalize this, when n electric power generation facilities are grouped into m small grids, $_{n-1}C_{m-1}$ combinations of opened/closed switches are possible.

In the present embodiment, when three electric power generation facilities are grouped into two small grids, $_2C_1=2$. A first combination is a case where the switch SW21 is opened while the switch SW23 is closed. In this case, the electric power generation facility 1 covers one group, and the electric power generation facilities 2 and 3 cover one group. A second combination is a case where the switch SW21 is closed while the switch SW23 is opened. In this case, the electric power generation facilities 1 and 2 cover one group, and the electric power generation facility 3 covers one group. As shown in FIG. 8B, the on/off conditions of the switches determine the on/off conditions of the electric power generation facilities.

The operating electric power generation facility determination part 120 assigns a load to an electric power generation facility to be turned on and excludes any combination (system configuration) that exceeds a rated capacity of an electric power generation facility from the options. For example, in the combination 1, the electric power generator facility 2 has a rated capacity of 200 kW and cannot cover a demand of 220 kW in total. Therefore, this setting (the setting of operating the electric power generator facility 2) is excluded from the options. The combination 2 is also subjected to the seeking process. Thus, possible combinations are limited.

Next, the operating electric power generation facility determination part 120 calculates a fuel cost of each of all combinations of electric power generation facilities that meet the electric power demand and selects a combination that achieves the minimum cost as a combination of electric power generation facilities to be operated (F405). In the example illustrated in FIG. 8B, the combinations 1 and 2 are compared to each other, and the combination 1, which costs less, is selected. The process of calculating the minimum cost may include calculating a start cost, a stop cost, and a running cost of an electric power generation facility to be operated and a cost following the amount of demand of a group of demand loads with respect to an electric power distribution period for each of combinations, and selecting a case having the smallest value.

Next, the operating electric power generation facility determination part 120 determines a connection configuration of the power transmission grid networks 300 that can implement a pair of the derived electric power generation facilities to be operated and a group of demand loads (F406). The connection configuration of the power transmission grid networks 300 may be obtained as a combination that meets a power transmission surplus in consideration of the physical connection system of the electric power generation facilities to be operated and the demand loads. At that time, the electric power generation facilities to be operated are separated into different systems. Specifically, the connection configuration of the power transmission grid networks 300 is determined such that each of the electric power generation facilities covers the paired demands with a single operation.

In this manner, with the operation rule to limit an operation of each of the electric power generation facilities to a single operation, a configuration of the power transmission grid networks is derived like opening and closing switches between grids in the illustrated example. Thus, there can properly be provided a system configuration that can further reduce a cost such as a fuel cost.

Embodiment 4

In Embodiment 3, the number of electric power generation facilities is increased by one at a time to obtain the minimum number of electric power generation facilities that can cover the power load. Furthermore, a combination that minimizes a fuel cost is selected from among configurations of the power transmission grid networks in which each of the electric power generation facilities performs a single operation.

Meanwhile, the cost may be low even with many electric power generators. For example, in some cases, three electric power generators can cover the demand at a lower fuel cost than two electric power generators can. For example, it is assumed that the control station determines that two electric power generators cover a power load of 1100 kW in total. When the least costly combination is a combination of a 650-kW electric power generator that covers 650 kW and a 1000-kW electric power generator that covers 450 kW, the output of the 1000-kW electric power generator falls below 50% of its rated capacity, thereby lowering the power generation efficiency. However, if three electric power generators are allowed to cover the load, each of two 300-kW electric power generators can cover a load of 225 kW, so that the load of 450 kW, which is covered by the 1000-kW electric power generator, can be covered by the two 300-kW electric power generators. The electric power generation output exceeds 75%. Thus, the total fuel cost can also be reduced.

Therefore, in the present embodiment, fuel costs are calculated for all combinations of configuration of one or more electric power generation facilities and power transmission grid networks that can cover all demands irrespective of the number of electric power generation facilities (combinations of switches turned on and off or the like). The least costly combination is selected from among those calculated results. The explanation of portions similar to those in the aforementioned embodiments will be omitted.

In the present embodiment, there will be described an example of an operation of selecting electric power generators (group) for 24 hours as emergency electric power distribution stations (electric power generation facilities) based upon prediction (estimated value) of electric power demands of the next day on the previous day. However, as with Embodiments 1-3, the control station may perform a similar selection operation at the timing of a start of a power cut. Furthermore, a schedule of a system configuration of a provisional operation for a power cut for all 24 hours may be determined based upon the amount of power supply demand that has been predicted on the previous day. A schedule of a system configuration of an operation for a power cut may be recalculated from a difference between a measured value of the demands on that day and the prediction. Then setting of a system configuration that will actually be constructed at the time of a power cut may be updated.

Figure 9:
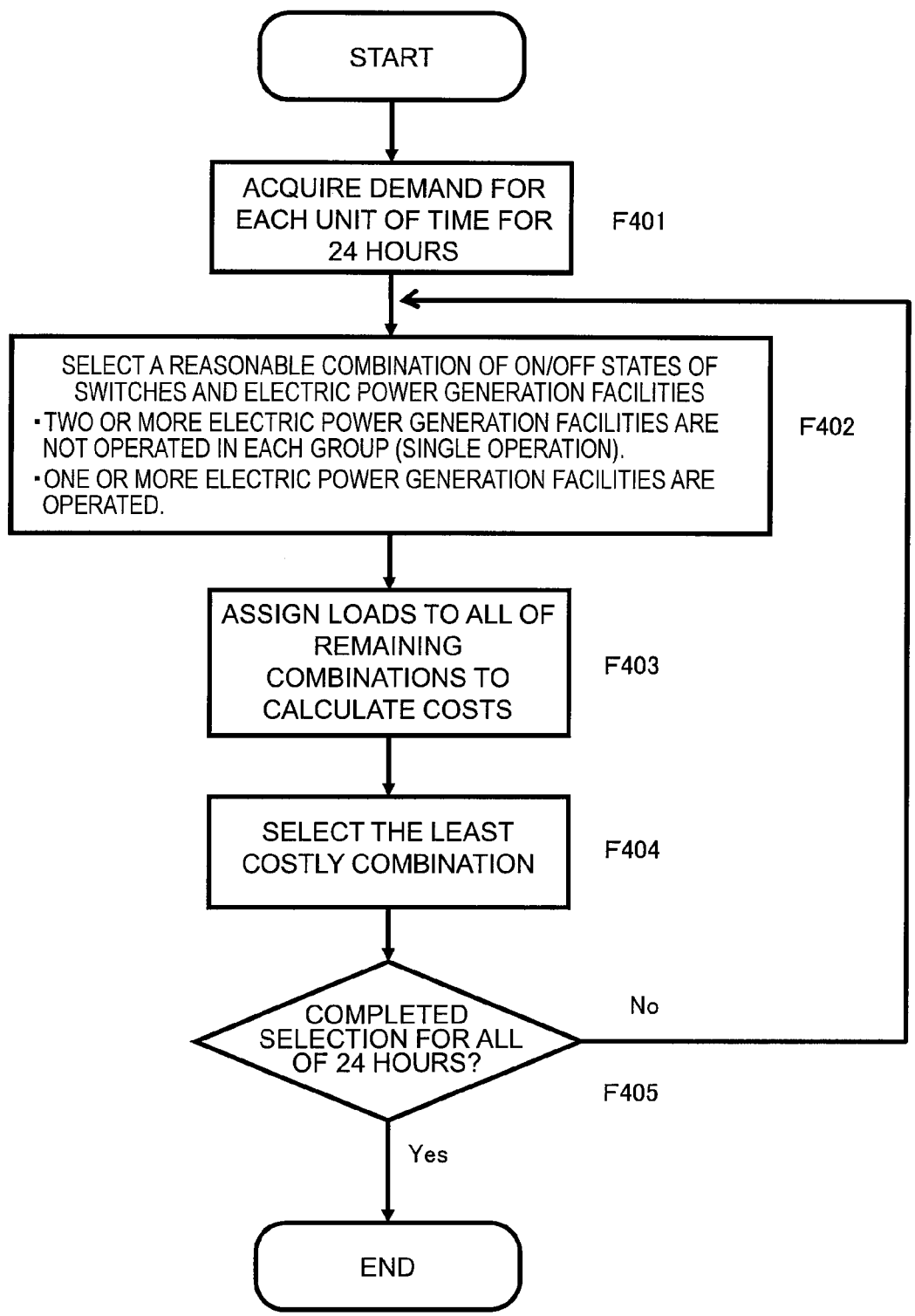
FIG. 9 is a flow chart showing an example operation of determining a system configuration for a group of power loads according to Embodiment 4.

FIG. 9 is a flow chart showing an example operation of determining a system configuration for a group of power loads according to the present embodiment. FIG. 10 is an explanatory diagram showing schedule table information illustrating a determined system configuration for each unit of time. FIG. 11 is an explanatory diagram showing demand prediction table information illustrating a list of electric power demand predictions that is used to determine a system configuration for each unit of time.

A procedure will be described with reference to the flow chart of FIG. 9. It is assumed that the electric power generation facilities 1-3 to be operated include three electric power generation facilities G1, G2, and G3, which have a rated output of 100 kW, 200 kW, and 300 kW, respectively (as with FIG. 6). The demand loads are divided into small groups L1-L3.

This procedure illustrated in the flow chart produces a schedule table as shown in FIG. 10 (referred to as a UC table). The electric power generation facilities and on-off states of switches in the electric power networks are represented by "0" and "1" for each of time frames. For the electric power generation facilities, "1" means an on-state (operated), and "0" means an off-state (stopped). For the switches, "1" means an on-state (closed), and "0" means an off-state (opened).

As shown in FIG. 11, the operating electric power generation facility determination part 120 of the centralized control station 100 acquires a demand prediction of the total load for each hour with respect to the groups L1-L3 from the electric power demand monitor part 120 (F401). As a matter of course, a demand prediction may be collected with a shorter unit of time, and the following operation may be performed with a shorter unit of time.

The operating electric power generation facility determination part 120 performs the processes from F402 to F404 for every unit of time from one o'clock to 24 o'clock (F402 to F405). Here, an example of the period between 7 o'clock and 8 o'clock will be described.

The number of combinations in this system configuration is based upon the start and stop of the three electric power generation facilities G1, G2, and G3 and the on/off states of the two switches SW12 and SW23. The total number of combinations is two to the fifth power, i.e., 32.

The operating electric power generation facility determination part 120 extracts reasonable combinations (system configurations) that can be formed as a system from all of the combinations in F402. The following two points can be considered for this reasonability determination. Furthermore, configurations that would be problematic to configure the system are excluded. (For example, it is preferable to exclude a configuration that only includes electric power generation facilities having poor follow-up capability or a configuration that only includes electric power generation facilities having a large disturbance.)

A first consideration is a combination that does not allow two or more electric power generation facilities to be operated for one load group (small group). The present embodiment adopts a system configuration that manages electric power generation facilities without a parallel operation but with a single operation. Therefore, one electric power generation facility is always operated in a group.

A second consideration is a condition that one or more electric power generation facilities are operated to supply electric power to each load when there is a demand (when a demand load is more than 0 W).

FIG. 12 represents extracted results of possible system configurations based upon the aforementioned operation rule in order to determine a system configuration for each unit of time.

As shown in FIG. 12, a group of reasonable system configurations can be shown by the table information.

In the combination 1 showing a system configuration, the switches SW12 and SW23 are closed, and all demand loads and electric power generation facilities form one group. Furthermore, this combination is a configuration showing a system configuration in which the electric power generation facility G1 bears capacity of electric power generation collectively for all of the loads.

In this combination 1, at least one electric power generation facility for supplying electric power to each of the loads is operated, and the number of electric power generation facilities being operated in each of the groups is one. Therefore, the combination 1 is determined to be a reasonable combination based upon the operation rule.

On the other hand, the combination 2 is a configuration in which the switches SW12 and SW23 are closed while three electric power generation facilities are operated. Furthermore, this combination is a configuration in which all loads and the electric power generation facilities form one electric power network. With this configuration, the electric power network includes one group. As a result, three electric power generation facilities are operated in one group. Accordingly, this combination can be determined to be a system configuration not having reasonability.

Furthermore, the combination 4 is a system configuration in which the demand load L1 to the electric power generation facility G1 forms one group, and in which the demand load L2 to the electric power generation facility G2 and the demand load L3 to the electric power generation facility G3 form one group. Thus, two groups (small electric power networks) are formed in total. However, no electric power generation facility is operated in each of the networks. Accordingly, this configuration can be determined not to be reasonable.

In this manner, the operating electric power generation facility determination part 120 determines the reasonability for each of other combinations and picks up only reasonable combinations from 32 combinations.

Next, the operating electric power generation facility determination part 120 assigns values to the electric power generation facilities and the loads (groups) and calculates a cost of each of the system configurations at F403. During this process, the operating electric power generation facility determination part 120 excludes any combinations in which the value of the load (demand of each of the groups) assigned to each of the electric power generation facilities subject to a single operation exceeds the value of the rated output of the electric power generation facility. The operating electric power generation facility determination part 120 may first narrow possible combinations by using the rated output and then calculate a cost of each of the system configurations.

Further explanation is provided with reference to FIG. 13. FIG. 13 shows results of selecting a combination that achieves a lower cost according to the amount of power supply demand (predicted demand) during the electric power distribution period (the operating unit of time) for each of the reasonable system configurations when a system configuration for each unit of time is determined. The combination numbers of the system configurations in FIG. 12 accord with the combination numbers in FIG. 13. The system configurations in FIG. 13 only show combinations that have been determined to be reasonable.

The combination 1 is a configuration in which 310 kW is assigned to the electric power generation facility G1. However, 310 kW is more than 100 kW, which is a rated output of the electric power generation facility G1. Accordingly, the combination 1 is excluded from the possible combinations. The combinations 5 and 7 are similarly excluded from the possible combinations.

In the combination 3, the demand load L1 to the electric power generation facility G1, the demand load L2 to the electric power generation facility G2, and the demand load L3 to the electric power generation facility G3 form a small group of an electric power network. A fuel cost per unit of time is calculated to be 1500 Yen. Similarly, in the combination 6, a fuel cost per unit of time is calculated to be 1300 Yen. In the combination 8, a fuel cost per unit of time is calculated to be 1200 Yen.

Then the operating electric power generation facility determination part 120 selects the least costly combination (system configuration) from among the possible combinations that have not been excluded (F404).

In this example, as seen from FIG. 13, the combination 8 is selected as the least costly combination. Specifically, the operating electric power generation facility determination part 120 sets, as a less costly system configuration, the value (1, 0, 0, 1, 1) of a combination for the period between 7 o'clock and 8 o'clock in the aforementioned example into the row of the schedule table shown in FIG. 10 that corresponds to the period between 7 o'clock and 8 o'clock.

The operating electric power generation facility determination part 120 follows the same flow from F402 to F404 for other time periods and sets the schedule table. Thus, the UC table shown in FIG. 10 is produced on the previous day and used for an emergency. When a power cut occurs, the centralized control station 100 reads a configuration of the current time period that has been calculated as a low-cost system configuration from the UC table and sets the electric power generation stations (electric power generation facilities), the electric power network switches, and the like for operation. As a result, electric power can quickly be distributed to consumers at a low cost upon a power cut.

In the present embodiment, only a fuel cost of electric power generation facilities being operated for each unit of time is considered to select an optimum combination of the electric power generation facilities and the electric power network configurations (on/off states of the switches SW). Costs relating to the start and stop of the electric power generators and the like are not considered. However, the number of on/off changes of each of the electric power generation facilities or the switches or fuel costs relating to the on/off changes may be considered as relevant parameters when time elapses over a plurality units of time. In other words, during a power cut, a selection process of an optimum combination of a system configuration for each unit of time may include adding a cost caused by changes of the system configuration. Furthermore, a shorter unit of time than others may be set for a time period during which electric power greatly varies.

Embodiment 5

Figure 14:
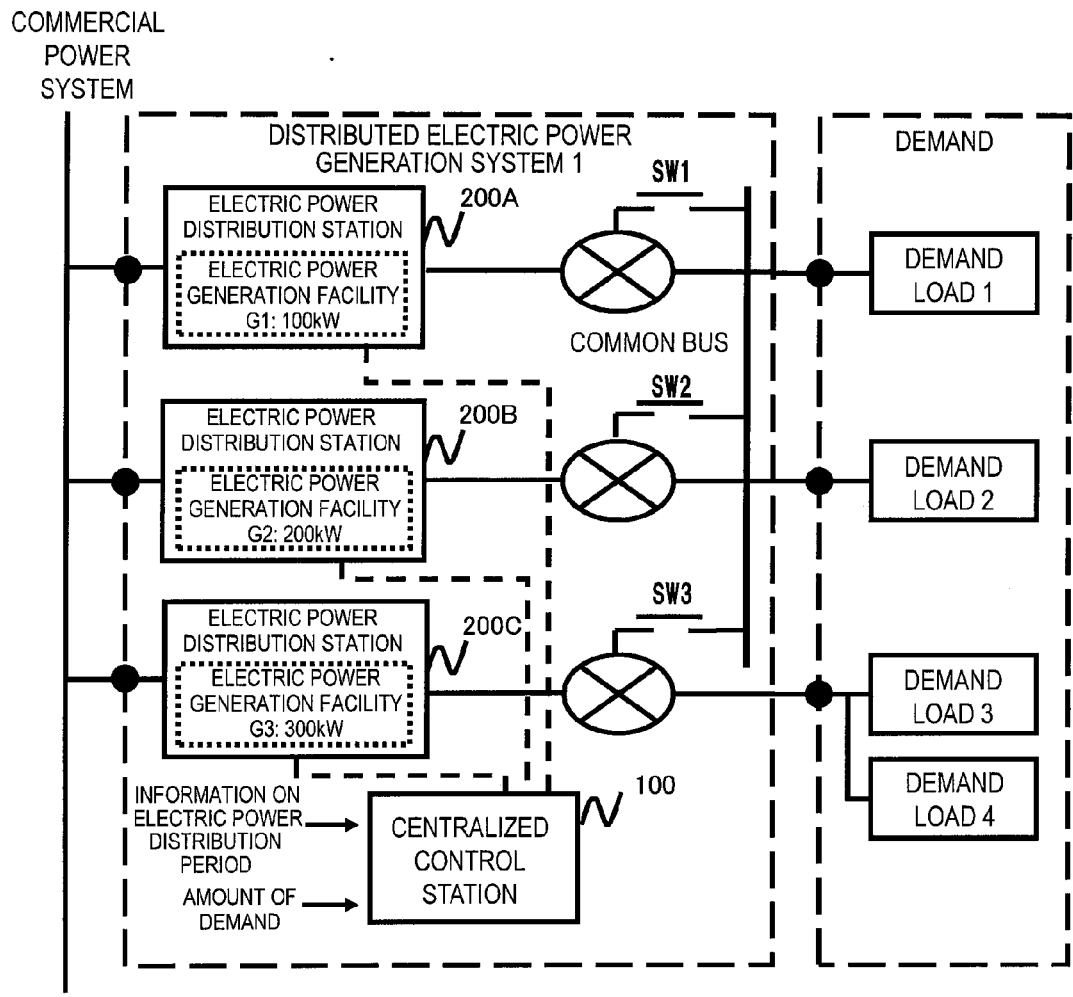
FIG. 14 is a system configuration diagram showing a distributed electric power generation system according to Embodiment 5.

FIG. 14 is a system configuration diagram showing a distributed electric power generation system according to Embodiment 5. In the present embodiment, an operation of pre-selecting an inexpensive system configuration for each unit of time as illustrated in Embodiment 4 will be described along with a configuration of a distributed electric power generation system having a common bus illustrated in FIG. 14. In this system configuration, a common bus is newly added. The common bus allows three electric power generation facilities provided in the electric power distribution stations 200 to be connected to a demand load connected to another electric power distribution station.

When the centralized control station 100 detects a power cut, it turns the switch SW1-SW3 on so as to connect the corresponding electric power distribution station to the common bus and turns the switches SW1-SW3 off so as to manage the corresponding electric power distribution stations without connection to the common bus such that electric power is supplied from the electric power generation facility in the electric power distribution station connected to its own load.

The following process is the same as that described in Embodiment 4. A system configuration for emergency for each unit of time may be pre-selected based upon the demand prediction. Alternatively, a system configuration may be selected at the beginning of a power cut.

Figure 15:
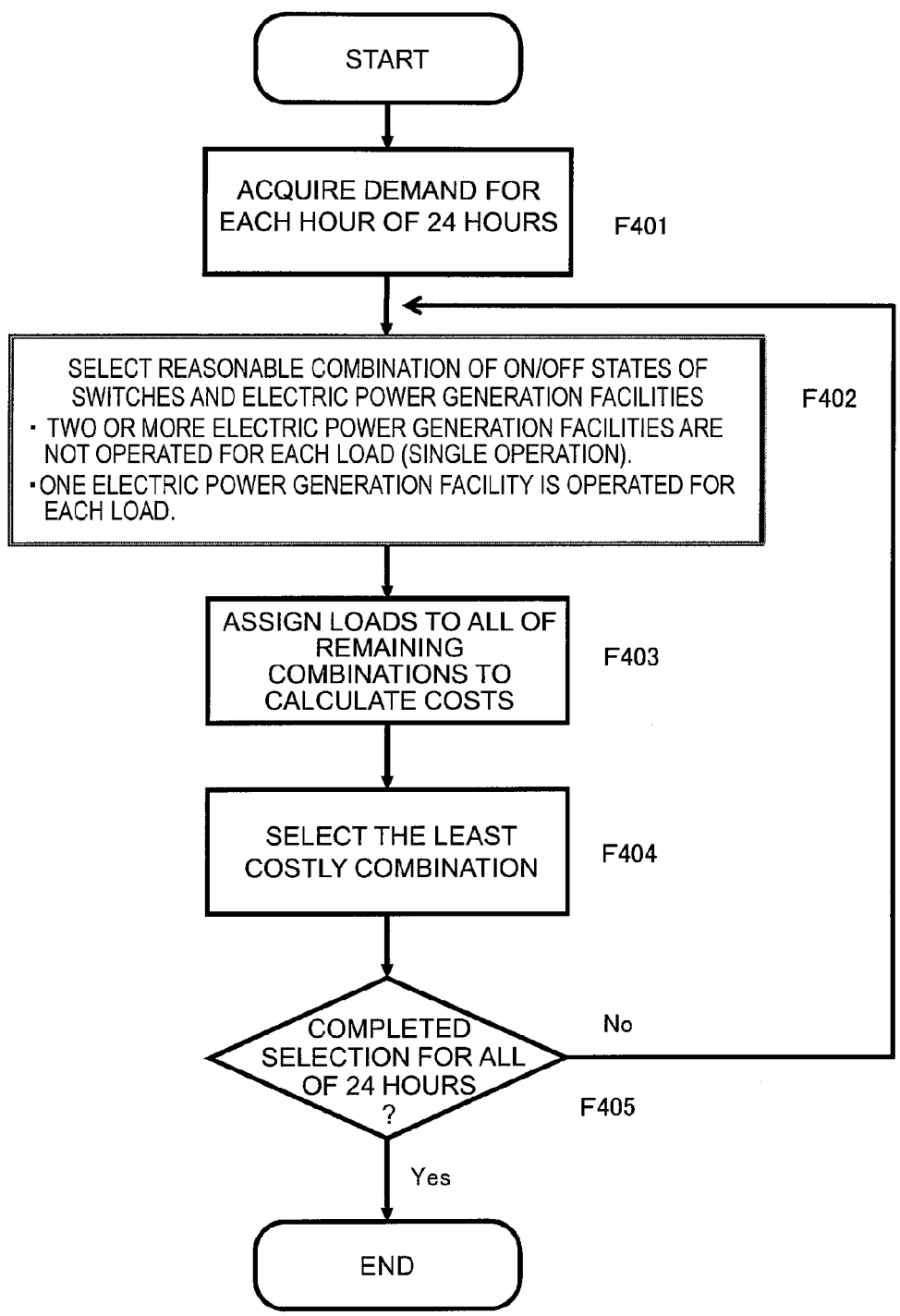
FIG. 15 is a flow chart showing an example operation of selecting a system configuration for a group of power loads according to Embodiment 5.

FIG. 15 is a flow chart showing an example operation of selecting a system configuration for a group of power loads. FIG. 16 shows schedule table information illustrating a determined system configuration for each unit of time.

In the following description, there will be described an example process of obtaining a setting of the UC table on the previous day. It is assumed that the rated capacity of the three electric power generation facilities G1-G3 connected to the demand loads 1-4 is 100 kW, 200 kW, and 300 kW, respectively. Predicted values are used for demands as with FIG. 11.

In the flow chart of FIG. 15, the procedure of F401 is the same as that described in Embodiment 4. Specifically, the operating electric power generation facility determination part 120 acquires a demand prediction for each unit of time (F401) and then sequentially determines an inexpensive system configuration for each unit of time (F402-405).

In the following description, the steps F402-F405 will be described with an example of a setting for the period between 7 o'clock and 8 o'clock. In the present embodiment, there are three electric power generation facilities and three switches. Therefore, the total number of combinations is two to the sixth power, i.e., 64.

When a system configuration is determined for each unit of time, the operating electric power generation facility determination part 120 determines the reasonability of each of the 64 system configurations for possible combinations based upon the operation rule and obtains the results as shown in FIG. 17 (F402). A first criterion of the reasonability is that two or more electric power generation facilities are not operated for one load. This is equivalent to the condition of Embodiment 4 that two or more electric power generation facilities are not operated within one electric power network. In this system, this criterion is set so as to perform a single operation. For example, if a system for synchronizing the power generators with each other is introduced in order to perform a parallel operation, this criterion may not necessarily be considered. A second criterion is that one electric power generation facility is operated for one load group. The on/off states of the switches and the electric power generation facilities are determined such that any of the electric power generation facilities always supplies electric power to a load group other than 0 W. This allows one electric power generation facility to supply electric power to a plurality of loads (see demand loads 3 and 4).

An example of the reasonability determination table information indicative of determination results of the reasonability as shown in FIG. 17 includes 10 combinations among all combinations.

In the combination 1, only the electric power generation facility G1 is operated, and the common bus is used to supply electric power to the power loads 1, 2, 3, and 4.

In the combination 2, all of the switches are turned on, and all of the electric power generation facilities are turned on. Three power generators are operated. As a result, this combination is determined to be excluded from the criterions of the present embodiment.

The combination 3 is a combination for a usual operation. None of the electric power generation facilities is connected to the common bus. All of the electric power generation facilities are operated to supply electric power to the demands being connected. Furthermore, in the combination 4, the electric power generation facilities G1 and G3 are connected to the common bus but are not operated. The loads connected to the electric power generation facilities G1 and G3 are not supplied with electric power. This does not meet the aforementioned criterions. Accordingly, this combination is excluded.

Thus, the operating electric power generation facility determination part 120 selects the combinations 1, 3, 5, 6, 7, 8, and 10 as system configurations determined to be reasonable combinations from among the possible system configurations (F402).

Next, the operating electric power generation facility determination part 120 assigns the amount of power supply demand (predicted value) for the electric power distribution period (the unit of time between 7 o'clock and 8 o'clock) to the selected combinations, respectively, and calculates a fuel cost of each of the combinations (F403). As shown in FIG. 11, the electric power demand between 7 o'clock and 8 o'clock is 90 kW for the load 1, 70 kW for the load 2, and 150 kW for the loads 3 and 4 in total. When a fuel cost is calculated by assigning those values to the remaining combinations in the table of FIG. 17, the data for selection that are illustrated in the selection result table information of FIG. 18 can be obtained.

Then the operating electric power generation facility determination part 120 excludes configurations that exceed a rated capacity of the electric power generation facilities, such as the combinations 1, 5, and 6, from the reasonable system configurations and selects the least costly combination from the remaining possible combinations. In this example, the combination in which the electric power generation facility 2 (having a rated output of 200 kW) covers the demand load of 70 kW of the load 2 and the electric power generation facility 3 (having a rated output of 300 kW) covers the total demand load of 260 kW of the loads 1, 3, and 4 has the lowest cost of 1200 Yen. Specifically, this combination 10 is selected as a system configuration for a time period between 7 o'clock and 8 o'clock.

In the power transmission grid network according to the present embodiment, limitations on a combination method of the demand loads and the electric power generation facilities are reduced. In Embodiment 4, the electric power generation facilities are connected directly to each other. Therefore, only the electric power generation facility of 200 kW and the demand load 2 cannot be made independent, and an optimized configuration in which the electric power generation facility of 300 kW is shared with the demand loads 1, 3, and 4 cannot be established. In contrast, with the configuration of the power transmission grid network according to the present embodiment, the aforementioned system configuration can be established. Thus, the number of possible combinations to be handled can be increased. Accordingly, a system configuration that can further reduce costs such as a fuel cost is expected to be derived.

Embodiment 6

Figure 19:
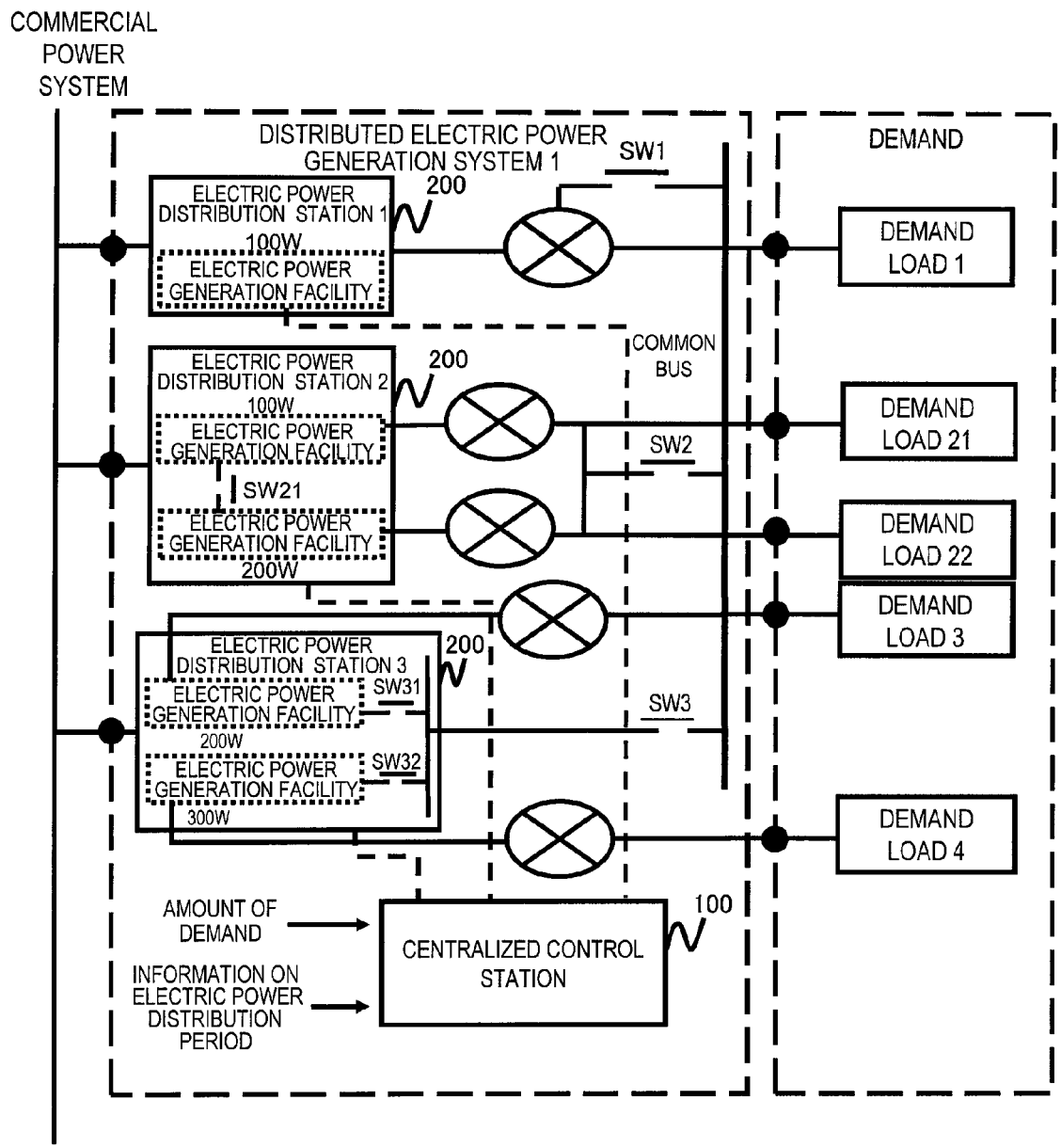
FIG. 19 is a system configuration diagram showing a distributed electric power generation system according to Embodiment 6.

FIG. 19 is a system configuration diagram showing a distributed electric power generation system according to Embodiment 6. The present embodiment has a distributed electric power generation system including two or more electric power generation facilities in the electric power distribution stations and also including a common bus.

In the present embodiment, two electric power generation facilities are provided in the electric power distribution station 2. As with the configuration of Embodiment 4, the electric power generation facilities are connected directly to each other. Furthermore, two electric power generation facilities are connected to each other via another common bus in the electric power distribution station 3.

In the present embodiment, electric power distribution between the electric power distribution stations is achieved via the general common bus. As with Embodiment 4, the power transmission grid network may be configured such that the electric power distribution stations are connected directly to each other.

When each of the electric power distribution stations 200 being operated is connected to the general common bus, it can be connected by closing the switch SW1-SW3 so as to carry out electric power distribution to the demand load assigned via the common bus.

For example, even if all of the switches SW1-SW3 are opened, electric power distribution can be carried out between the electric power generation facilities in its own electric power distribution station with respect to the electric power distribution station 2 and the electric power distribution station 3. For example, the electric power distribution station 2 includes a 100-kW electric power generation facility and a 200-kW electric power generation facility, which are connected to the demand load 21 and the demand load 22, respectively. If the switch SW21 is opened, the demand load 21 is supplied with electric power from only the 100-kW electric power generation facility. If the switch SW21 is closed, the demand load 21 is supplied with electric power not only from the 100-kW electric power generation facility but also from the 200-kW electric power generation facility. As a matter of course, both of the demand loads 21 and 22 may be supplied with electric power from the 200-kW electric power distribution facility.

In the present embodiment, a system configuration for each unit of time is determined by centralized control. The flow chart of a process of determining a system configuration is the same as that in FIG. 15. FIG. 20 illustrates a schedule table generated by this process.

FIG. 21 is an explanatory diagram showing reasonability determination table information illustrating the results of determining the reasonability as possible system configurations based upon the operation rule when a system configuration for each unit of time is to be determined.

The centralized control station 100 examines the reasonability of each of possible combinations in the flow chart F402 with use of the reasonability determination table information shown in FIG. 21 and extracts combinations that meet the reasonability.

FIG. 21 shows only a portion of the possible combinations. In the combination 1, all of the switches SW1-SW3 are set to be 1. Thus, all of the electric power distribution stations are connected to the common bus, and only the electric power generation facility G1 installed in the electric power distribution station 1 is operated. In the combination 2, all of the electric power distribution stations are connected to the common bus. Two or more electric power generation facilities G1, G21, and G31 are operated in one group. Therefore, this combination does not meet the criterions for the reasonability. Thus, this combination is excluded. In this manner, the combinations 1, 2, 5, 7, 8, and 10 meet the criterion for the reasonability.

Next, in order to obtain the selection result table information illustrated in FIG. 22, the centralized control station 100 assigns the predicted amount of demand for each unit of time to the electric power generation facilities being operated and calculates a cost of each of the possible combinations (F403). Here, there will be described an example in which the demand loads 1, 21, 22, 3, and 4 have a demand of 80 kW, 50 kW, 50 kW, 150 kW, and 100 kW, respectively. The combination 1 is a setting in which the electric power generation facility G1 is required to have an output of 380 kW, which is the sum of all of the loads. However, the electric power generation facility G1 has a rated output of 100 kW. Thus, the required output exceeds the capacity. In this manner, the combinations 1 and 5 are excluded from the possible options because the amount of demand does not match the capacity of the electric power generation facilities in the combinations 1 and 5. The least costly combination of the remaining combinations is the combination 8. Only the electric power generation facility G31 of the electric power distribution station 3 and the power load 31 are independently managed without connection to the common bus. Other loads are supplied with electric power from the 300-kW electric power generation facility.

According to the present embodiment, a less costly combination can be selected if a plurality of electric power generation facilities are installed in an electric power distribution facility.

As described above, according to the present invention, there can be provided a distributed electric power generation system that can reduce a running cost of a low-output operation of electric power generation facilities and a fuel cost relating to turning on and off the electric power generation facilities by reducing the number of electric power generation facilities having low cost effectiveness, and a method of controlling such a distributed electric power generation system.

In the existing distributed power supply systems, various kinds of operation control techniques have been proposed to optimize the energy efficiency when electric power generating apparatuses to be operated are to be determined. However, whether a power cut period of a commercial power supply is long or short, electric power generation facilities are operated with a low output so as to match the amount of demand of each of power loads. Therefore, a large loss is caused to a fuel cost, for example, due to the start of the electric power generation facilities. Accordingly, in the distributed electric power generation system, when electric power generation facilities to be operated for covering demands are selected upon a power cut of an external power source, a period of the power cut and the amount of electric power generation required during the power cut period are calculated. One or a required number of electric power generation facilities that supply electric power at a low cost are selected in a centralized or distributed control station based upon a start and stop cost and a running cost of the individual electric power generation facilities. Electric power is supplied from those electric power generation facilities to the demands. As a result, according to the present invention, a fuel cost and the like can be reduced by regulating the number of electric power generation facilities being operated during a power cut period, during which an operation period of the electric power generation facilities greatly affects the electric power generation cost. Furthermore, there can be provided an operation of obtaining a less costly combination based upon a currency unit.

Various existing power generators or electric power generation facilities such as a diesel generator, a fuel cell, and a cogeneration power generator may be used as the electric power generation means provided in the electric power distribution stations. Furthermore, the system may be configured to distribute excess electric power to the trunk line network. Alternatively, the system may be configured to supply electric power to the demands from the external power source and a plurality of electric power distribution stations in a mixed manner.

The respective portions of the aforementioned control station may be implemented by using a combination of hardware and software. In a form of the combination of hardware and software, a program according to the present invention is expanded into a RAM. The hardware such as a CPU is operated in accordance with the program so as to allow respective portions to serve as a variety of means. This program may be recorded on a storage medium and distributed. The program recorded on the storage medium is read into a memory via a wired network, a wireless network, or the storage medium itself so as to operate the CPU and the like. Examples of the storage medium include an optical disk, a magnetic disk, a semiconductor memory device, a hard disk, and the like.

When the aforementioned embodiments are translated into another expression, one or more information processing apparatuses to be operated as a centralized control station can be implemented by operating a CPU as a variety of means based upon a service program for managing a distributed electric power generation system, which has been expanded into a RAM. Furthermore, the centralized control station may be implemented by using a cloud system via the Internet.

Although the present invention has been described with several embodiments, variations such as separation or integration of the block configurations, rearrangement of the steps, and combination of part or all of the contents of each of the embodiments into another embodiment are possible as long as they meet the spirit of the present invention and the aforementioned functions. The following description does not limit the present invention.

Some or all of the aforementioned embodiments may be described in the following supplementary notes. Nevertheless, the present invention is not limited to following supplementary notes.

[Supplementary Note]

A control station for distributed electric power generation characterized by comprising:

a power cut status detection part operable to acquire information on an electric power distribution period used to calculate a period during which electric power supply is needed upon an interruption of electric power supply from an external power source in order to supply electric power to a plurality of demand loads connected to a power transmission grid network with a plurality of electric power distribution stations that can generate electric power upon the interruption of the external power source;

an electric power demand monitor part operable to acquire an amount of power supply demand to be supplied via the power transmission grid network during the period during which electric power supply is needed, the period being determined from the information on the electric power distribution period; and an operating electric power generation facility determination part operable to select a less costly combination of one or a required number of electric power distribution stations for supplying electric power to the plurality of demand loads as electric power generation facilities based upon a start and stop cost and a running cost of each of the electric power distribution stations in accordance with the calculated electric power distribution period and the amount of power supply demand.

[Supplementary Note]

The control station as recited in the above supplementary note, characterized by selecting a minimum number of electric power distribution stations to be used for supplying electric power that can cover the amount of power supply demand from among a plurality of possible selectable electric power distribution stations.

[Supplementary Note]

The control station as recited in the above supplementary note, characterized by selecting an increased number of electric power distribution stations that meet the amount of power supply demand when no single electric power distribution station can generate an amount of electric power that meets the amount of power supply demand.

[Supplementary Note]

The control station as recited in the above supplementary note, characterized by, when an amount of electric power generation that meets the amount of power supply demand is to be distributed, operating a plurality of electric power distribution stations in accordance with the amount of power supply demand, switching a configuration of the power transmission grid network, and determining a system configuration in which each of the electric power distribution stations being operated supplies electric power to the demand loads assigned to the electric power distribution station.

[Supplementary Note]

The control station as recited in the above supplementary note, characterized by, when no electric power is received from the external power source, connecting any of the electric power distribution stations to be operated to a common power line provided in the power transmission grid network so as to determine a system configuration in which the demand loads assigned to the electric power distribution stations receive electric power supply from another electric power distribution station.

[Supplementary Note]

The control station as recited in the above supplementary note, characterized by, when no electric power is received from the external power source, connecting any of the electric power distribution stations to be operated to the demand loads assigned to an electric power distribution station not to be operated that is located adjacent to the electric power distribution station to be operated on a power line so as to determine a system configuration in which all of the demand loads receive electric power supply.

[Supplementary Note]

The control station as recited in the above supplementary note, characterized by, when no electric power is received from the external power source, connecting any of the electric power distribution stations to be operated to the demand loads assigned to an electric power distribution station not to be operated that is located adjacent to the electric power distribution station to be operated on a power line or connecting any of the electric power distribution stations to be operated to the demand loads assigned to an electric power distribution station not to be operated with use of a common power line so as to determine a system configuration in which all of the demand loads receive electric power supply.

[Supplementary Note]

The control station as recited in the above supplementary note, characterized by calculating a predicted power cut period for power supply interruption period information defining a period during which an input electric power is interrupted based upon information on power cuts that have been collected in the past and selecting a system configuration based upon the calculated predicted power cut period.

[Supplementary Note]

The control station as recited in the above supplementary note, characterized by, when a power cut occurs in the external power source, using a threshold defining a predetermined power cut period during which the electric power distribution stations that have supplied electric power to the demand loads before the power cut are not operated to determine whether or not electric power is supplied from an electric power distribution station other than the electric power distribution stations that have supplied electric power to the demand loads.

[Supplementary Note]

The control station as recited in the above supplementary note, characterized by selecting a system configuration with adding a power transmission loss caused by electric power distribution between the electric power distribution stations during a power cut of the external power source to the costs.

[Supplementary Note]

The control station as recited in the above supplementary note, characterized by distributing electric power distribution stations to be operated based upon an operation history of each of the electric power distribution stations.

[Supplementary Note]

The control station as recited in the above supplementary note, characterized in that: some or all of the electric power distribution stations under the direction of the control station have a battery facility as an electric power generation facility, and the battery facility is operated to reduce a running cost of another electric power generation facility to select a less costly system configuration.

[Supplementary Note]

The control station as recited in the above supplementary note, characterized in that: some or all of the electric power distribution stations under the direction of the control station have a battery facility as an electric power generation facility, and the battery facility is operated to reduce a running cost of an electric power generation facility having a low output but consuming a large amount of fuel to select a less costly system configuration.

[Supplementary Note]

The control station as recited in the above supplementary note, characterized by switching power transmission distribution paths of the power transmission grid network by a remote operation to connect the selected electric power distribution stations to the demand loads.

[Supplementary Note]

The control station as recited in the above supplementary note, characterized by turning on or off the electric power generation facilities of the electric power distribution stations to be operated to connect the selected electric power distribution stations to the demand loads.

[Supplementary Note]

The control station as recited in the above supplementary note, characterized by holding start/stop-operation cost curve data indicative of changes in cost of each of the electric power distribution stations with time and comparing the start/stop-operation cost curves of the electric power distribution stations to select one or a required number of electric power distribution stations to be operated.

[Supplementary Note]

The control station as recited in the above supplementary note, characterized by reselecting the electric power distribution stations when the electric power distribution station used to supply electric power is out of a predetermined efficiency range due to a demand variation during the electric power distribution period of the electric power distribution stations.

[Supplementary Note]

A control station operable to control individual amounts of power generation of a plurality of power generators provided in a predetermined grid without any external power source and to manage supply of electric power corresponding to a demand consumed in the predetermined grid, characterized by:

acquiring information on an electric power distribution period used to calculate a period during which electric power supply is needed upon an interruption of electric power supply from the external power source and acquiring an amount of power supply demand that corresponds to a demand consumed in the predetermined grid during the period during which electric power supply is needed, the period being determined from the acquired information on the electric power distribution period, and determining whether a single power generator capable of maintaining a predetermined efficiency for the demand can supply electric power based upon the calculated electric power distribution period and the amount of power supply demand.

[Supplementary Note]

A distributed electric power generation system characterized by comprising:

a plurality of electric power distribution stations operable to receive electric power from an external power source and generate electric power in a balanced manner;

a power transmission grid network connected to the plurality of electric power distribution stations for supplying received electric power to a plurality of demand loads using electric power; and the control station as recited in the above supplementary note.

[Supplementary Note]

The distributed electric power generation system as recited in the above supplementary note, characterized in that:

some or all of the electric power distribution stations have a plurality of electric power generation facilities, and the control station selects a less costly combination of electric power generation facilities to be operated based upon a start and stop cost and a running cost of each of the electric power generation facilities.

[Supplementary Note]

The distributed electric power generation system as recited in the above supplementary note, characterized in that some or all of the electric power distribution stations have a plurality of types of electric power generation facilities.

[Supplementary Note]

The distributed electric power generation system as recited in the above supplementary note, characterized in that some or all of the electric power distribution stations have a battery facility as an electric power generation facility.

[Supplementary Note]

The distributed electric power generation system as recited in the above supplementary note, characterized in that each of the electric power distribution stations receives electric power via ac/ac conversion or ac/dc conversion from the external power source.

[Supplementary Note]

A method of controlling distributed electric power generation with information processing, characterized by comprising:

an information acquisition step of acquiring information on an electric power distribution period used to calculate a period during which electric power supply is needed upon an interruption of electric power supply from an external power source in order to supply electric power to a plurality of demand loads connected to a power transmission grid network with a plurality of electric power distribution stations that can generate electric power upon the interruption of the external power source and acquiring an amount of power supply demand to be supplied via the power transmission grid network during the period during which electric power supply is needed, the period being determined from the acquired information on the electric power distribution period; and a selection step of selecting a less costly combination of one or a required number of electric power distribution stations for supplying electric power to the plurality of demand loads as electric power generation facilities in advance or upon a power cut based upon a start and stop cost and a running cost of each of the electric power distribution stations in accordance with the calculated electric power distribution period and the amount of power supply demand.

[Supplementary Note]

The control method as recited in the above supplementary note, characterized in that the selection step comprises selecting a minimum number of electric power distribution stations to be used for supplying electric power that can cover the amount of power supply demand from among a plurality of possible selectable electric power distribution stations.

[Supplementary Note]

The control method as recited in the above supplementary note, characterized in that the selection step comprises selecting an increased number of electric power distribution stations that meet the amount of power supply demand when no single electric power distribution station can generate an amount of electric power that meets the amount of power supply demand.

[Supplementary Note]

The method of controlling distributed electric power generation as recited in the above supplementary note, characterized in that the selection step comprises, when an amount of electric power generation that meets the amount of power supply demand is to be distributed, operating a plurality of electric power distribution stations in accordance with the amount of power supply demand, switching a configuration of the power transmission grid network, and determining a system configuration in which each of the electric power distribution stations being operated supplies electric power to the demand loads assigned to the electric power distribution station.

[Supplementary Note]

The method of controlling distributed electric power generation as recited in the above supplementary note, characterized in that:

the power transmission grid network includes a common power line to which each of the electric power distribution stations and the demand loads assigned to the electric power distribution stations can be connected, and the selection step comprises, when no electric power is received from the external power source, connecting any of the electric power distribution stations to be operated to the common power line so as to determine a system configuration in which the demand loads assigned to the electric power distribution stations receive electric power supply from another electric power distribution station.

[Supplementary Note]

The method of controlling distributed electric power generation as recited in the above supplementary note, characterized in that the selection step comprises, when no electric power is received from the external power source, connecting any of the electric power distribution stations to be operated to the demand loads assigned to an electric power distribution station not to be operated that is located adjacent to the electric power distribution station to be operated on a power line so as to determine a system configuration in which all of the demand loads receive electric power supply.

[Supplementary Note]

The method of controlling distributed electric power generation as recited in the above supplementary note, characterized in that the selection step comprises, when no electric power is received from the external power source, connecting any of the electric power distribution stations to be operated to the demand loads assigned to an electric power distribution station not to be operated that is located adjacent to the electric power distribution station to be operated on a power line or connects any of the electric power distribution stations to be operated to the demand loads assigned to an electric power distribution station not to be operated with use of a common power line so as to determine a system configuration in which all of the demand loads receive electric power supply.

[Supplementary Note]

The method of controlling distributed electric power generation as recited in the above supplementary note, characterized in that some or all of the electric power distribution stations have a plurality of electric power generation facilities, and the selection step comprises selecting a less costly combination of electric power generation facilities to be operated based upon a start and stop cost and a running cost of each of the electric power generation facilities.

[Supplementary Note]

The method of controlling distributed electric power generation as recited in the above supplementary note, characterized in that some or all of the electric power distribution stations have a battery facility as an electric power generation facility, and the selection step comprises operating the battery facility to reduce a running cost of other electric power generation facilities to select a less costly system configuration.

[Supplementary Note]

The method of controlling distributed electric power generation as recited in the above supplementary note, characterized in that:

some or all of the electric power distribution stations have a battery facility as an electric power generation facility, and the selection step comprises operating the battery facility to reduce a running cost of an electric power generation facility having a low output but consuming a large amount of fuel to select a less costly system configuration.

[Supplementary Note]

The control method as recited in the above supplementary note, characterized in that the selection step comprises calculating a predicted power cut period for power supply interruption period information defining a period during which an input electric power is interrupted based upon information on power cuts that have been collected in the past and selecting a system configuration based upon the calculated predicted power cut period.

[Supplementary Note]

The control method as recited in the above supplementary note, characterized in that the selection step comprises, when a power cut occurs in the external power source, using a threshold defining a predetermined power cut period during which the electric power distribution stations that have supplied electric power to the demand loads before the power cut are not operated to determine whether or not electric power is supplied from an electric power distribution station other than the electric power distribution stations that have supplied electric power to the demand loads.

[Supplementary Note]

The control method as recited in the above supplementary note, characterized in that the selection step comprises selecting electric power distribution stations to be operated with adding a power transmission loss caused by electric power distribution between the electric power distribution stations during a power cut of the external power source to the costs.

[Supplementary Note]

The control method as recited in the above supplementary note, characterized in that the selection step comprises distributing electric power distribution stations to be operated based upon an operation history of each of the electric power distribution stations.

[Supplementary Note]

The control method as recited in the above supplementary note, characterized by comprising a remote operation step of switching power transmission distribution paths of the power transmission grid network by a remote operation to connect the selected electric power distribution stations to the demand loads.

[Supplementary Note]

The method of controlling distributed electric power generation as recited in the above supplementary note, characterized by comprising a remote operation step of turning on or off the electric power generation facilities of the electric power distribution stations to be operated to connect the selected electric power distribution stations to the demand loads.

[Supplementary Note]

The control method as recited in the above supplementary note, characterized by holding start/stop-operation cost curve data indicative of changes in cost of each of the electric power distribution stations with time and comparing the start/stop-operation cost curves of the electric power distribution stations to select one or a required number of electric power distribution stations to be operated.

[Supplementary Note]

The control method as recited in the above supplementary note, characterized in that the selection step comprises reselecting the electric power distribution stations when the electric power distribution station used to supply electric power is out of a predetermined efficiency range due to a demand variation during the electric power distribution period of the electric power distribution stations.

[Supplementary Note]

A control method of a control station operable to control individual amounts of power generation of a plurality of power generators provided in a predetermined grid without any external power source and to supply electric power corresponding to a demand consumed in the predetermined grid, characterized by:

acquiring information on an electric power distribution period used to calculate a period during which electric power supply is needed upon an interruption of electric power supply from the external power source and acquiring an amount of power supply demand that corresponds to a demand consumed in the predetermined grid during the period during which electric power supply is needed, the period being determined from the acquired information on the electric power distribution period, and determining whether a single power generator capable of maintaining a predetermined efficiency for the demand can supply electric power based upon the calculated electric power distribution period and the amount of power supply demand.

This application claims the benefit of priority from Japanese patent application No. 2012-269151, filed on Dec. 10, 2012, the disclosure of which is incorporated herein in its entirety by reference.

DESCRIPTION OF REFERENCE NUMERALS AND SIGNS 1 distributed electric power generation system
100 centralized control station (control station, controlling apparatus)
110 electric power demand monitor part (electric power demand monitoring means)
120 operating electric power generation facility determination part (operating electric power generation facility determination means)
121 selection part (selection means, determination means)
122 electric power generation facility information storage part (electric power generation facility information storage means)
130 power cut status detection part (power cut status detection means)
140 communication part (communication means)
200 electric power distribution station (electric power generation facility, battery facility)
300 power transmission grid network

The invention claimed is:

1. A distributed electric power generation system comprising:
   a plurality of electric power distribution stations configured to receive electric power from a commercial power supply and to generate adjustable electric power;
   a power transmission grid network including a plurality of switches and connected to the plurality of electric power distribution stations and a plurality of demand loads; and
   a control station including a memory storing instructions and a processor configured to execute the instructions to:
      acquire information on an electric power distribution period used to calculate a period during which electric power supply is needed;
      acquire an amount of power supply demand to be supplied via the power transmission grid network during the period during which electric power supply is needed, the period being determined from the acquired information on the electric power distribution period;
      select the least costly combination of one or a required number of the electric power distribution stations for the plurality of demand loads based upon a start and stop cost and a running cost of each of the electric power distribution stations in accordance with the calculated electric power distribution period and the amount of power supply demand;
      operate the plurality of electric power distribution stations in accordance with the amount of power supply demand;
      switch a configuration of the power transmission grid network;
      assign the plurality of demand loads to each of the electric power distribution stations; and
      when the distributed electric power generation system does not receive electric power from the commercial power supply, connect any of the electric power distribution stations to be operated to the demand loads assigned to an electric power distribution station not to be operated with use of a common power line so as to determine a system configuration in which all of the demand loads receive electric power supply.

2. The distributed electric power generation system according to claim 1, wherein:
   the processor is further configured to execute the instructions to select the minimum number of the electric power distribution stations that can cover the amount of power supply demand.

3. The distributed electric power generation system according to claim 1, wherein the processor is further configured to execute the instructions to select an increased number of the electric power distribution stations that meet the amount of power supply demand when no single electric power distribution station can generate an amount of electric power that meets the amount of power supply demand.

4. The distributed electric power generation system according to claim 1, wherein:
   the power transmission grid network includes a first power line configured to connect to each of the electric power distribution stations and the demand loads assigned to the electric power distribution stations, and
   the processor is further configured to execute the instructions to, when the distributed electric power generation system does not receive electric power from the commercial power supply, connect any of the electric power distribution stations to be operated to the first power line so as to determine a system configuration in which the demand loads assigned to the electric power distribution stations receive electric power supply from another electric power distribution station.

5. The distributed electric power generation system according to claim 1, wherein, the processor is further configured to execute the instructions to, when the distributed electric power generation system does not receive electric power from the commercial power supply, connect any of the electric power distribution stations to be operated to the demand loads assigned to an electric power distribution station not to be operated, the electric power distribution station not to be operated being located adjacent to the electric power distribution station to be operated on a power line, so as to determine a system configuration in which all of the demand loads receive electric power supply.

6. The distributed electric power generation system according to claim 1, wherein:
   one of the electric power distribution stations has a plurality of electric power generation facilities, and
   the processor is further configured to execute the instructions to select the least costly combination of electric power generation facilities to be operated based upon a start and stop cost and a running cost of each of the electric power generation facilities.

7. The distributed electric power generation system according to claim 1, wherein one of the electric power distribution stations has a plurality of types of electric power generation facilities.

8. The distributed electric power generation system according to claim 1, wherein one of the electric power distribution stations has a battery facility as an electric power generation facility.

9. The distributed electric power generation system according to claim 1, wherein each of the electric power distribution stations receives electric power via ac/ac conversion or ac/dc conversion from the commercial power supply.

10. The distributed electric power generation system according to claim 1, wherein the processor is further configured to execute the instructions to switch power transmission distribution paths of the power transmission grid network by remote operation to connect the selected electric power distribution stations to the demand loads.

11. The distributed electric power generation system according to claim 1, wherein the processor is further configured to execute the instructions to hold start-to-stop-operation cost curve data indicative of changes in cost of each of the electric power distribution stations with start-operation to stop-operation; and
compare the start-to-stop-operation cost curves of the electric power distribution stations to select one or a required number of electric power distribution stations to be operated.

12. The distributed electric power generation system according to claim 1, wherein the processor is further configured to execute the instructions to reselect the electric power distribution stations when the electric power distribution station used to supply electric power is out of a predetermined efficiency range due to a demand variation during the electric power distribution period of the electric power distribution stations.

13. A control station for distributed electric power generation, wherein the control station includes a memory storing instructions and a processor configured to execute the instructions to:
acquire information on an electric power distribution period used to calculate a period during which electric power supply is needed upon an interruption of electric power supply from a commercial power supply in order to supply electric power to a plurality of demand loads connected to a power transmission grid network with a plurality of electric power distribution stations that can generate electric power upon the interruption of the commercial power supply;
acquire an amount of power supply demand to be supplied via the power transmission grid network during the period during which electric power supply is needed, the period being determined from the information on the electric power distribution period;
select the least costly combination of one or a required number of electric power distribution stations for the plurality of demand loads as electric power generation facilities based upon a start and stop cost and a running cost of each of the electric power distribution stations in accordance with the calculated electric power distribution period and the amount of power supply demand;
operate the plurality of electric power distribution stations in accordance with the amount of power supply demand;
switch a configuration of the power transmission grid network; and
assign the plurality of demand loads to each of the electric power distribution station; and
when the distributed electric power generation system does not receive electric power from the commercial power supply, connect any of the electric power distribution stations to be operated to the demand loads assigned to an electric power distribution station not to be operated with use of a common power line so as to determine a system configuration in which all of the demand loads receive electric power supply.

14. The control station according to claim 13, wherein the processor is further configured to execute the instructions to select the minimum number of electric power distribution stations that can cover the amount of power supply demand from among a plurality of possible selectable electric power distribution stations.

15. The control station according to claim 13, wherein the processor is further configured to execute the instructions to select an increased number of electric power distribution stations that meet the amount of power supply demand when no single electric power distribution station can generate an amount of electric power that meets the amount of power supply demand.

16. The control station according to claim 13, wherein, the processor is further configured to execute the instructions to, when the distributed electric power generation system does not receive electric power from the commercial power supply, connect any of the electric power distribution stations to be operated to a first power line provided in the power transmission grid network so as to determine a system configuration in which the demand loads assigned to the electric power distribution stations receive electric power supply from another electric power distribution station.

17. The control station according to claim 13, wherein, the processor is further configured to execute the instructions to, when the distributed electric power generation system does not receive electric power from the commercial power supply, connect any of the electric power distribution stations to be operated to the demand loads assigned to an electric power distribution station not to be operated, the electric power distribution station not to be operated being located adjacent to the electric power distribution station to be operated on a power line, so as to determine a system configuration in which all of the demand loads receive electric power supply.

18. The control station according to claim 13, wherein the processor is further configured to execute the instructions to calculate a predicted power cut period for power supply interruption period information defining a period during which an input electric power is interrupted based upon information on power cuts that have been collected in the past and select a system configuration based upon the calculated predicted power cut period.

19. The control station according to claim 13, wherein the processor is further configured to execute the instructions to, when a power cut occurs in the commercial power supply, and use is made about a threshold defining a predetermined power cut period during which the electric power distribution stations that have supplied electric power to the demand loads before the power cut are not operated, determine whether or not electric power is supplied from an electric power distribution station other than the electric power distribution stations that have supplied electric power to the demand loads.

20. The control station according to claim 13, wherein the processor is further configured to execute the instructions to:
select a system configuration including adding a power transmission loss caused by electric power distribution between the electric power distribution stations during a power cut of the commercial power supply.

21. A method of controlling a distributed electric power generation system including a memory storing instructions, and a processor configured to execute the instructions, the method comprising:

acquiring information, by the processor, on an electric power distribution period used to calculate a period during which electric power supply is needed upon an interruption of electric power supply from a commercial power supply to supply electric power to a plurality of demand loads connected to a power transmission grid network with a plurality of electric power distribution stations that can generate electric power upon the interruption of the commercial power supply;

acquiring, by the processor, an amount of power supply demand to be supplied via the power transmission grid network during the period during which electric power supply is needed, the period being determined from the acquired information on the electric power distribution period;

selecting, by the processor, the least costly combination of one or a required number of electric power distribution stations to the plurality of demand loads as electric power generation facilities based upon a start and stop cost and a running cost of each of the electric power distribution stations in accordance with the calculated electric power distribution period and the amount of power supply demand;

operating, by the processor, the plurality of electric power distribution stations in accordance with the amount of power supply demand;

switching, by the processor, a configuration of the power transmission grid network;

assigning, by the processor, the plurality of demand loads to each of the electric power distribution station; and when the distributed electric power generation system does not receive electric power from the commercial power supply, connecting any of the electric power distribution stations to be operated to the demand loads assigned to an electric power distribution station not to be operated with use of a common power line so as to determine a system configuration in which all of the demand loads receive electric power supply.

22. The method of controlling a distributed electric power generation system according to claim 21, further comprising:

selecting, by the processor, the least costly combination with use of a currency indicative of values of the start and stop cost and the running cost.

* * * * *